United States Patent
Ledner et al.

(10) Patent No.: US 12,462,557 B2
(45) Date of Patent: Nov. 4, 2025

(54) METHOD, APPARATUS, AND SYSTEM FOR POLE EXTRACTION FROM OPTICAL IMAGERY

(71) Applicant: HERE Global B.V., Eindhoven (NL)

(72) Inventors: Robert Ledner, Boulder, CO (US); Xiaoying Jin, Boulder, CO (US); Holly Russell, Lafayette, CO (US); Joseph Tankovich, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 492 days.

(21) Appl. No.: 17/853,445

(22) Filed: Jun. 29, 2022

(65) Prior Publication Data

US 2023/0206625 A1 Jun. 29, 2023

Related U.S. Application Data

(60) Provisional application No. 63/293,360, filed on Dec. 23, 2021.

(51) Int. Cl.
G06V 20/10 (2022.01)
G01C 11/08 (2006.01)
G06V 10/82 (2022.01)

(52) U.S. Cl.
CPC ............ *G06V 20/176* (2022.01); *G01C 11/08* (2013.01); *G06V 10/82* (2022.01)

(58) Field of Classification Search
CPC ...... G06V 20/176; G06V 10/82; G01C 11/08; G06T 2207/10012; G06T 2207/10016;
(Continued)

(56) References Cited

U.S. PATENT DOCUMENTS 10,846,511 B2  11/2020  Ozkucur et al.
2018/0268256 A1 *  9/2018  Di Febbo ............. G06V 10/454
(Continued)

FOREIGN PATENT DOCUMENTS

GB  2576322 B  *  2/2020  ........... G05D 1/0251

OTHER PUBLICATIONS

Zhang et al, An enhanced multi-view vertical line locus matching algorithm of object space ground primitives based on positioning consistency for aerial and space images, ISPRS J. of Photogrammetry and Remote Sensing 139 (2018) 241-254. (Year: 2018).*

(Continued)

*Primary Examiner* — Kathleen M Broughton
(74) *Attorney, Agent, or Firm* — DITTHAVONG, STEINER & MLOTKOWSKI

(57) ABSTRACT

An approach is provided for pole extraction from optical imagery. The approach involves, for instance, processing a plurality of images using a machine learning model to generate a plurality of redundant observations of a pole-like object and/or their semantic keypoints respectively depicted in the plurality of images. The approach also involves performing a photogrammetric triangulation of the plurality of redundant observations to determine three-dimensional coordinate data of the pole-like object and/or their semantic keypoints. The approach further involves providing the three-dimensional coordinate data of the pole-like object as an output.

14 Claims, 13 Drawing Sheets

(58) Field of Classification Search
CPC . G06T 2207/10032; G06T 2207/30184; G06T 2207/30232; G06T 2207/30236; G06T 7/55

See application file for complete search history.

(56) References Cited

U.S. PATENT DOCUMENTS

| | | | | |
|---|---|---|---|---|
| 2019/0163990 | A1* | 5/2019 | Mei | B60R 11/04 |
| 2020/0134311 | A1* | 4/2020 | Pojman | G06V 30/422 |
| 2021/0020073 | A1 | 1/2021 | Asmari et al. | |
| 2021/0118165 | A1* | 4/2021 | Strong | G06T 7/11 |
| 2021/0166426 | A1* | 6/2021 | McCormac | G05D 1/2437 |
| 2021/0201569 | A1* | 7/2021 | Marschner | G01S 17/89 |
| 2023/0206584 | A1* | 6/2023 | Jin | G06V 20/17 |
| | | | | 382/103 |

OTHER PUBLICATIONS

Mao et al, Deep Neural Networks for Road Sign Detection and Embedded Modeling Using Oblique Aerial Images, 2021, Remote Sensors, 13 (879): 1-24. (Year: 2021).*

He et al., "Mask R-CNN", Published in: 2017 IEEE International Conference on Computer Vision (ICCV), pp. 2961-2969.

Gomes et al., "Mapping Utility Poles in Aerial Orthoimages Using ATSS Deep Learning Method", Letter, Published: Oct. 26, 2020, 14 pages.

Alam et al., "Automatic assessment and prediction of the resilience of utility poles using unmanned aerial vehicles and computer vision techniques", International Journal of Disaster Risk Science, vol. 11, Feb. 19, 2020, pp. 119-132.

Zang et al., "Using deep learning to identify utility poles with crossarms and estimate their locations from google street view images", Article, Sensors (Basel), Aug. 1, 2018;18(8):2484, 21 pages.

Yang et al., "A skeleton-based hierarchical method for detecting 3-d pole-like objects from mobile lidar point clouds", Article, Published in: IEEE Geoscience and Remote Sensing Letters (vol. 16, Issue: 5, May 2019), published Dec. 28, 2018, pp. 801-805.

Eigen et al., "Depth Map Prediction from a Single Image using a Multi-Scale Deep Network", Article, NIPS'14: Proceedings of the 27th International Conference on Neural Information Processing Systems—vol. 2, Published:Dec. 8, 2014, pp. 1-9.

Ranftl et al., "Vision Transformers for Dense Prediction", International Conference on Computer Vision (ICCV), Mar. 24, 2021, 10 pages.

Godard et al., "Unsupervised Monocular Depth Estimation with Left-Right Consistency", Published in: 2017 IEEE Conference on Computer Vision and Pattern Recognition (CVPR), Sep. 13, 2016, 14 pages.

Godard et al., "Digging Into Self-Supervised Monocular Depth Estimation", Published in: 2019 IEEE/CVF International Conference on Computer Vision (ICCV), Jun. 2018, 18 pages.

Office Action for related European Patent Application No. 22216109.3-1224, dated May 22, 2023, 9 pages.

He et al., "Mask R-CNN", 2017 IEEE International Conference on Computer Vision (ICCV), Mar. 20, 2017, 9 pages.

* cited by examiner

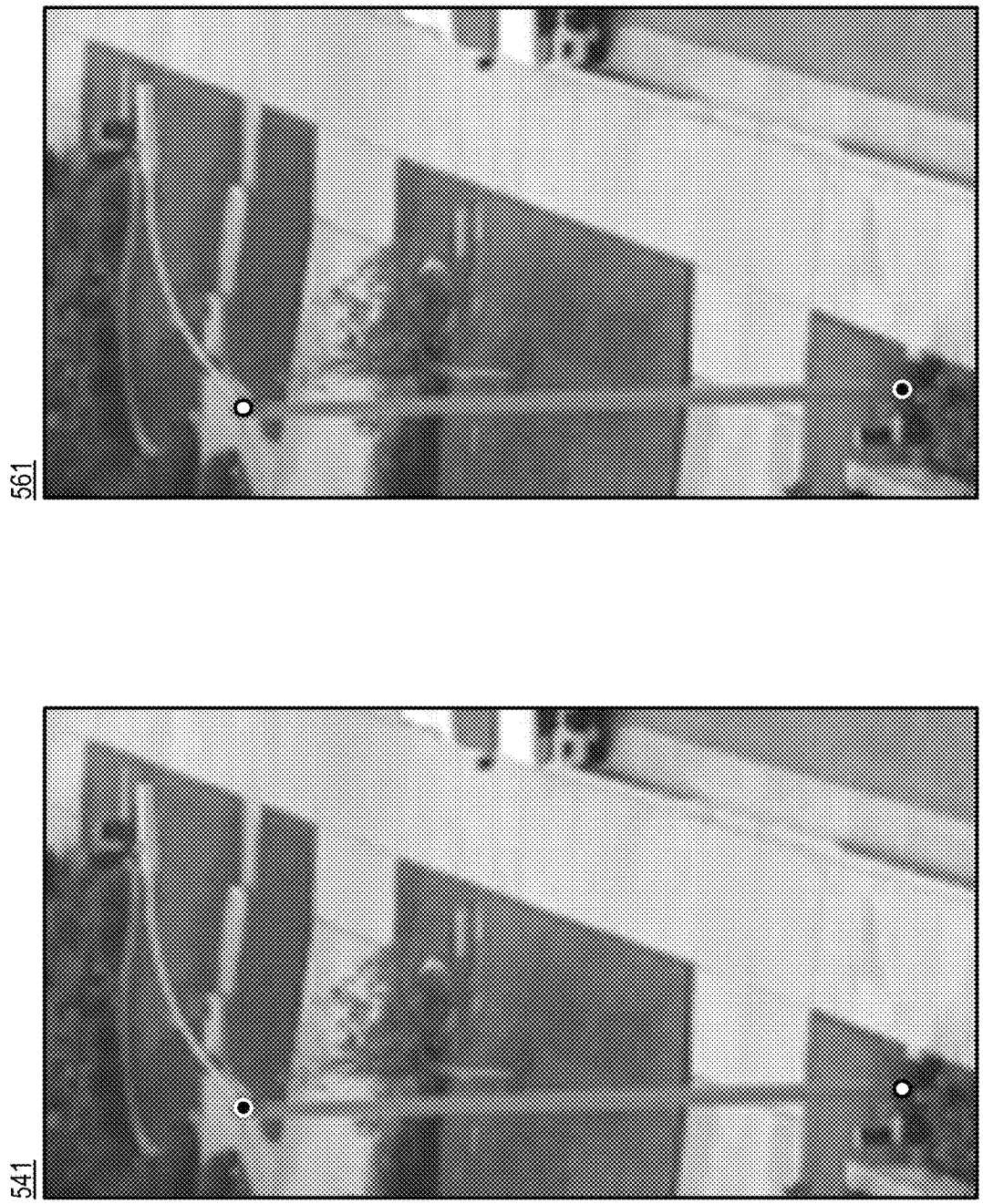

METHOD, APPARATUS, AND SYSTEM FOR POLE EXTRACTION FROM OPTICAL IMAGERY

RELATED APPLICATION

This application claims priority from U.S. Provisional Application Ser. No. 63/293,360, entitled "METHOD, APPARATUS, AND SYSTEM FOR POLE EXTRACTION FROM OPTICAL IMAGERY," filed on Dec. 23, 2021, the contents of which are hereby incorporated herein in its entirety by this reference.

BACKGROUND

Mapping and navigation service providers often provide the geolocations and attributes of poles, pole-like objects, or other equivalent cartographic features for use across a wide range of industries and applications. However, determining the geolocations and attributes of poles and other objects across large geographic areas present significant technical challenges because these objects are often ubiquitous and large in number.

SOME EXAMPLE EMBODIMENTS

Therefore, there is a need for automatic extraction of pole, pole-like objects, and other equivalent cartographic features from optical imagery.

According to one embodiment, a method comprises processing a plurality of images using a machine learning model to generate a plurality of redundant observations of a pole-like object (or other object) respectively depicted in the plurality of images. The method also comprises performing a photogrammetric triangulation of the plurality of redundant observations to determine three-dimensional coordinate data of the pole-like object. The method further comprises providing the three-dimensional coordinate data of the pole-like object as an output.

According to another embodiment, an apparatus comprises at least one processor, and at least one memory including computer program code for one or more computer programs, the at least one memory and the computer program code configured to, with the at least one processor, cause, at least in part, the apparatus to process a plurality of images using a machine learning model to generate a plurality of redundant observations of a pole-like object (or other object) respectively depicted in the plurality of images. The apparatus is also caused to perform a photogrammetric triangulation of the plurality of redundant observations to determine three-dimensional coordinate data of the pole-like object. The apparatus is further caused to provide the three-dimensional coordinate data of the pole-like object as an output.

According to another embodiment, a non-transitory computer-readable storage medium carries one or more sequences of one or more instructions which, when executed by one or more processors, cause, at least in part, an apparatus to process a plurality of images using a machine learning model to generate a plurality of redundant observations of a pole-like object (or other object) respectively depicted in the plurality of images. The apparatus is also caused to perform a photogrammetric triangulation of the plurality of redundant observations to determine three-dimensional coordinate data of the pole-like object. The apparatus is further caused to provide the three-dimensional coordinate data of the pole-like object as an output. Also, a computer program product may be provided. For example, a computer program product comprising instructions which, when the program is executed by a computer, cause the computer to carry out the steps described herein.

According to another embodiment, an apparatus comprises means for processing a plurality of images using a machine learning model to generate a plurality of redundant observations of a pole-like object (or other object) respectively depicted in the plurality of images. The apparatus also comprises means for performing a photogrammetric triangulation of the plurality of redundant observations to determine three-dimensional coordinate data of the pole-like object. The apparatus further comprises means for providing the three-dimensional coordinate data of the pole-like object as an output.

According to one embodiment, a method comprises retrieving a machine learning model that is trained to detect one or more semantic keypoints associated with a pole-like object (or other object) in a plurality of images. The method also comprises processing the plurality of images using the machine learning model to generate a plurality of redundant observations of the pole-like object, wherein the plurality of redundant observations includes respective detections of the one or more semantic keypoints. The method further comprises providing the plurality of redundant observations as an output.

According to another embodiment, an apparatus comprises at least one processor, and at least one memory including computer program code for one or more computer programs, the at least one memory and the computer program code configured to, with the at least one processor, cause, at least in part, the apparatus to retrieve a machine learning model that is trained to detect one or more semantic keypoints associated with a pole-like object (or other object) in a plurality of images. The apparatus is also caused to process the plurality of images using the machine learning model to generate a plurality of redundant observations of the pole-like object, wherein the plurality of redundant observations includes respective detections of the one or more semantic keypoints. The apparatus is further caused to provide the plurality of redundant observations as an output.

According to another embodiment, a non-transitory computer-readable storage medium carries one or more sequences of one or more instructions which, when executed by one or more processors, cause, at least in part, an apparatus to retrieve a machine learning model that is trained to detect one or more semantic keypoints associated with a pole-like object (or other object) in a plurality of images. The apparatus is also caused to process the plurality of images using the machine learning model to generate a plurality of redundant observations of the pole-like object, wherein the plurality of redundant observations includes respective detections of the one or more semantic keypoints. The apparatus is further caused to provide the plurality of redundant observations as an output. Also, a computer program product may be provided. For example, a computer program product comprising instructions which, when the program is executed by a computer, cause the computer to carry out the steps described herein.

According to another embodiment, an apparatus comprises means for retrieving a machine learning model that is trained to detect one or more semantic keypoints associated with a pole-like object (or other object) in a plurality of images. The apparatus also comprises means for processing the plurality of images using the machine learning model to generate a plurality of redundant observations of the pole-like object, wherein the plurality of redundant observations includes respective detections of the one or more semantic keypoints. The apparatus further comprises means for providing the plurality of redundant observations as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one method/process or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 5A-5D are diagrams illustrating example ways to label training images in a consistent order, according to example embodiment;

DESCRIPTION OF SOME EMBODIMENTS

Examples of a method, apparatus, and computer program for pole (or other object) extraction from optical imagery are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. For example, although the various embodiments described herein are discussed with respect to extracting pole-like objects from optical imagery, it is contemplated that the embodiments are applicable to the extraction of any other type of object depicted in the optical imagery. In other instances, well-known structures and devices are shown in block diagram form in order to avoid unnecessarily obscuring the embodiments of the invention.

Figure 1:
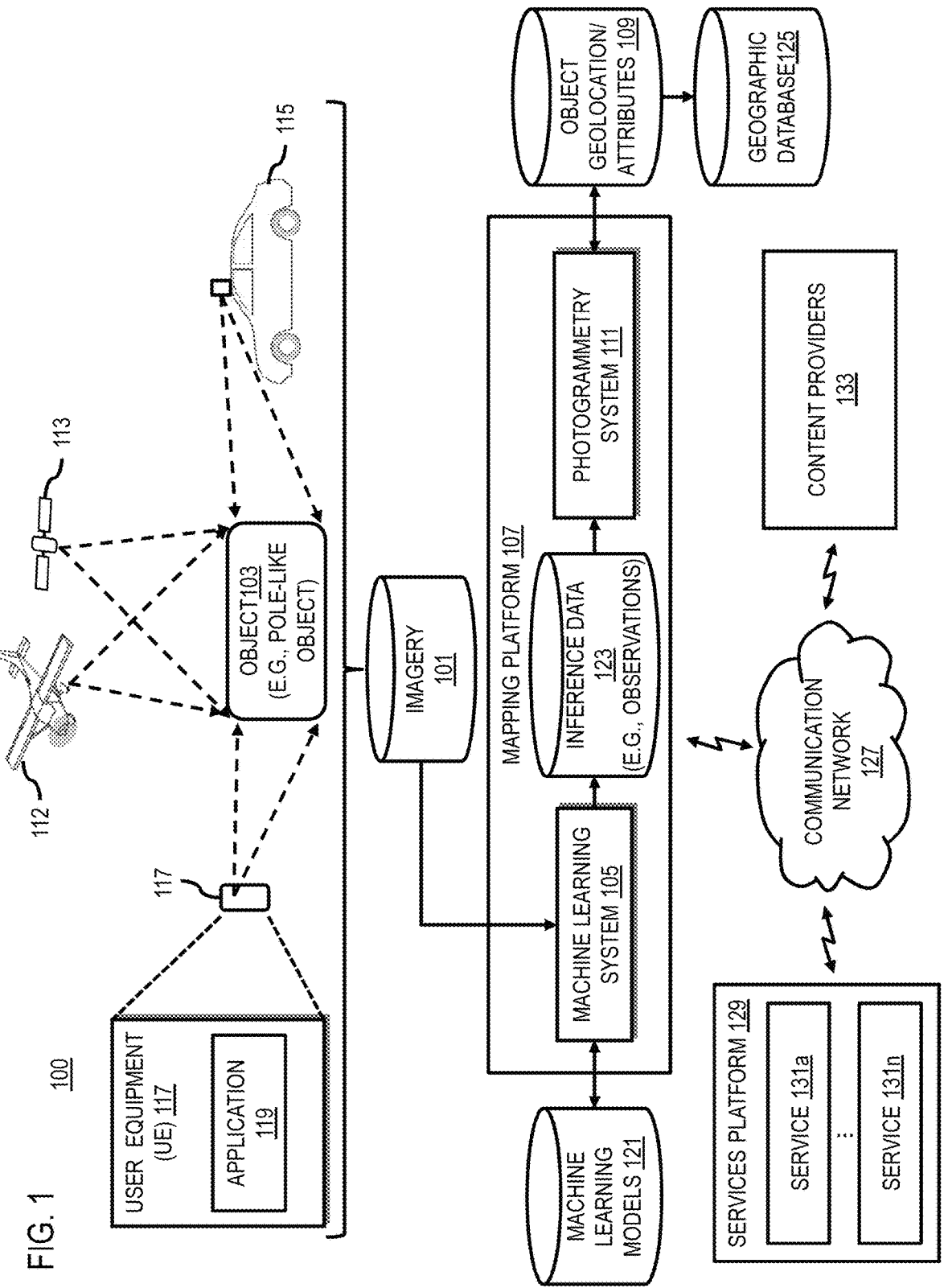
FIG. 1 is a diagram of a system capable of pole (or other object) extraction from optical imagery, according to example embodiments.

FIG. 1 is a diagram of a system 100 capable of pole (or other object) extraction from optical imagery, according to example embodiments. As noted above, mapping and navigation service providers face significant technical challenges with respect to mapping cartographic features across large geographic areas. One area of development for addressing this technical challenge is the use of optical imagery (e.g., optical imagery 101) to facilitate such mapping, particularly for specific object types such as but not limited to poles or pole-like objects. As used herein, poles or pole-like objects generally are made up entirely or at least partially of a long slender section (usually but not necessarily cylindrical).

Poles and pole-like objects typically appear frequently in an environment in the form of lamp posts, utility poles, traffic light supports, signposts, columns, and/or the like. Because they are generally installed at fixed positions, they often are mapped as reference points or guides.

For example, extracting pole geolocations and attributes from optical imagery 101 has multiple uses in multiple industries, including, for instance, the automotive and telecommunication industries. For the automotive industry, pole map features are very useful for vehicle localization since they are distinct, persistent and ubiquitous, especially in urban areas. For telecommunication industries, poles and smart poles are used to install communications equipment on (e.g., 4G and 5G wireless equipment such as base stations). For both applications, it is critical to know the geolocations and geometric attributes of poles. By way of example, the geometric attributes of poles and/or other objects of interest include but are not limited to length (e.g., pole length in the case of pole-like objects) and orientation (e.g., pole orientation in the case of pole-like objects). For automotive applications, feature geolocations and attributes are used for association and localization. Association is usually a component to find matches to, and fuse/aggregate features from crowdsourced data to create a map representing the real world. Association is also a component to determine exactly where a vehicle is in the world and in the map ("localization"). For telecommunication applications, pole geolocations and attributes are used for planning of the wireless equipment installation.

Traditional approaches to mapping poles or other objects in the environment are often labor and time intensive because the process may be conducted using ground-based field surveys, or human interpretation of remote sensing imagery with high spatial resolution. Thus, service providers face particular technical challenges with respect to reducing or otherwise minimizing the resources needed to map poles or other objects.

To address these technical challenges, the system 100 introduces a capability to automatically extract pole-like or other objects (e.g., objects 103) from optical imagery 101 (e.g., via a machine learning system 105 of a mapping platform 107 or equivalent process) and then determine their geolocations and/or attributes (e.g., object geolocation/attributes 109) by applying photogrammetry on the extracted objects (e.g., via a photogrammetry system 111 of the mapping platform 107 or equivalent process). By way of example, the optical imagery 101 can include any type of imagery including but not limited to: (1) aerial imagery captured by aircraft 112 (or any other type of flying object such as but not limited to planes, drones, etc.); (2) satellite imagery by satellites 113; or (3) street level imagery captured by cameras or equivalent sensors of vehicles 115 and/or user equipment (UEs) devices 117 (e.g., smartphones, tablets, etc.) executing applications supporting capture of imagery 101 for processing according to the various embodiments described herein. By way of example, optical imagery 101 that is aerial imagery can be used to cover large geographic areas with high geospatial accuracy. In one embodiment, the images can have high enough spatial resolution such that the poles are detectable by the machine learning system 105 above a target level of confidence (e.g., greater than 0.8 or 0.9 in a range from 0.0-1.0).

Figure 2:
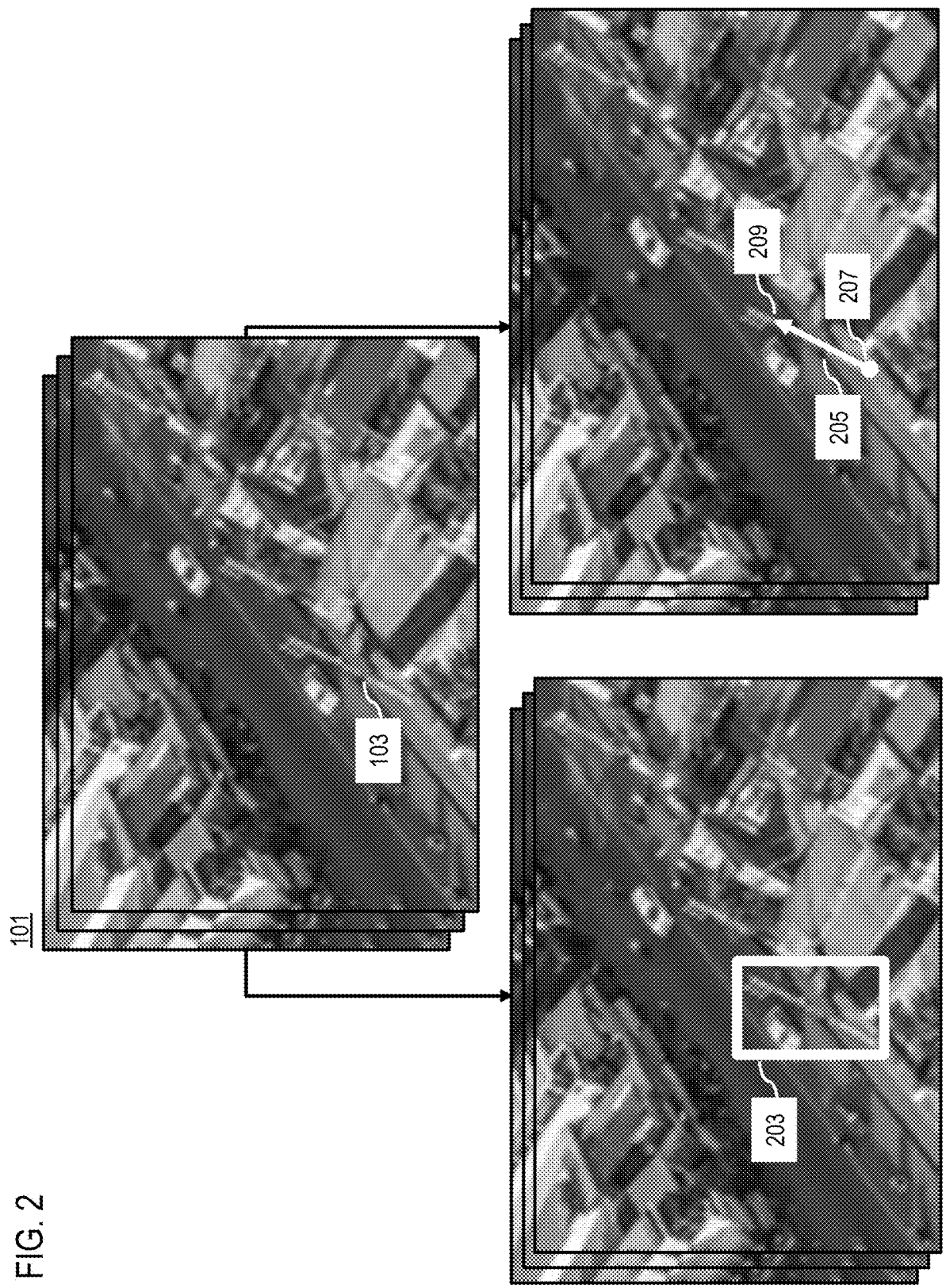
FIG. 2 is a diagram illustrating example imagery and redundant observations of pole-like images, according to example embodiments.

In one embodiment, the machine learning system 105 can use trained machine learning models (e.g., machine learning models 121) to process the collected imagery 101 to detect pole-like objects or any other objects of interest (e.g., objects 103) using deep learning technology (e.g., Convolutional Neural Networks (CNNs)) that has shown promise to detect generic man-made objects from images automatically. As shown in FIG. 2, the optical imagery 101 may include one or more images of a pole-like object 103 (e.g., one or more images of the same object from multiple perspectives or viewpoints). In one embodiment, the machine learning system 105 can use a machine learning model 121 that uses a deep learning detection method (e.g. You Only Look Once (YOLO), Faster Region-based Convolutional Neural Networks (faster R-CNNs), or equivalent) to generate a bounding box 203 around the detected pole-like object 103 present in the images. The bounding box 203 is an example of the inference data 123 provided by the machine learning system 105 and represents observations of the pole-like object 103. When multiple images of the same pole-like object 103 are processed the by the machine learning system 105, the resulting multiple bounding boxes 203 represent redundant observations of the pole-like object 103 (e.g., from different perspectives or viewpoints corresponding to the camera locations capturing the respective images).

Generally, the bounding box 203 is a rectangular box containing the object detected in the processed image and does not provide a precise location of the feature. In one embodiment, the geolocation can be standardized to the center point, a specific corner, or any other designated point of the bounding box 203 (e.g., a corner corresponding to the base of the pole-like object 103). The machine learning system 105 can also optionally output a computed confidence score (e.g., ranging from 0.0 representing no confidence to 1.0 representing 100% confidence) that the bounding box 203 encompasses the pole-like object 103.

In another embodiment, instead of providing bounding boxes as the inference data 123 representing detected observations of an object 103, the machine learning system 105 can support the detection of the precise locations of poles or other objects 103 and their semantic keypoints simultaneously. As used herein a semantic keypoint refers a point on the object that represents the object 103 of interest. For example, with respect to a pole-like object 103, semantic keypoints can include but is not limited to a bottom point of the pole and a top-most point of a straight section of the pole. In one embodiment, the selection of these semantic keypoints enables the system 100 to additionally support the determination of the geometric attributes of poles (e.g., length, orientation, etc.) from optical imagery 101 when compared to determining a bounding box alone. As shown in FIG. 2, the semantic keypoint observation 205 output of the machine learning system 105 for a pole-like object 103 can include a semantic point 207 corresponding to a detected base of the pole-like object (e.g., represented by a dot at the end of the arrow) and the top-most point of the straight section of the pole-like object 103 (e.g., represented by the tip 209 of the arrow).

In one embodiment, the system 100 simultaneously extracts the pole geolocations, keypoints, and geometric attributes from optical imagery 101 (e.g., oblique aerial imagery, street level imagery, etc.). As a first step, detecting poles or pole-like objects 103 in optical imagery 101 is modeled as detecting the straight (and usually near-vertical) subsection of the pole. In one embodiment, the straight/near-vertical subsection of the pole can be defined by at least two semantic keypoints. For example, one semantic keypoint is the bottom point of the pole, and another semantic keypoint is the top point of the straight/near-vertical subsection. This approach is taken to simplify and regularize the pole detection problem. All poles typically have a central section starting at a base point near the ground and extending upwards in a straight line. Beyond this many types of poles often diverge geometrically in various ways in their upper portions, for example the curved sections often found at the tops of street light poles. It is noted that the example of semantic keypoints of pole-like objects 103 are provided by way of illustration and not as limitations. It is contemplated that the various embodiments described herein can be used with any type of object 103 and any number or type semantic keypoints that are associated with the object 103.

In summary, in example embodiment, the system 100 uses an automated method to simultaneously detect the pole-like objects 103 and localize their semantic keypoints from optical imagery 101. Here semantic key points are defined as the lowest (or bottom) and highest (or top) points that respectively define the straight sections of poles. Keypoint detection using deep learning is proposed to directly detect both the bottom point and the top point of the straight/near-vertical subsection for the poles. In one embodiment, mask R-CNN (or any equivalent machine learning model) is used an implementation of a keypoint detection deep learning network.

In one embodiment, to enable the keypoint detection deep learning network (e.g., a machine learning model 121 of the machine learning system 105) to learn the different contexts for the bottom point and the top point of the poles, the two semantic keypoints selected for the pole-like object 103 (or any other designated number keypoints) are manually labeled or annotated in a consistent order for every pole-like object 103 in a training dataset comprising optical imagery 101 depicting samples of pole-like objects 103. The size, types of samples, etc. of the training dataset can be selected based on the target levels of generalizability, accuracy, etc. of the trained machine learning model 121. The labeled data is then fed into the keypoint detection deep learning network to train the model 121 to detect the pole-like objects 103 and their two semantic keypoints.

After the pole-like objects 103 (e.g., in embodiments with bounding box or keypoint detection) and/or their two semantic keypoints (e.g., in embodiments with keypoint detection) are detected from multiple images with different viewing angles, the photogrammetry system 111 can use logic based on the principles of multi-view photogrammetry to match the detected objects/features from different images and to then photogrammetrically triangulate the pole observations (e.g., inference data 123) from multiple overlapping images in order to determine three-dimensional (3D) coordinates of the pole-like objects 103 (e.g., object geolocation/attributes 109) and/or the semantic keypoints (e.g., the bottom points and the top points of poles) detected by the deep learning inference engine (e.g., the machine learning system 105). In one embodiment, geometric attributes of the pole-like objects 103 (e.g., length and orientation) can then be directly calculated from the semantic keypoints (e.g., the top and bottom points) associated with each pole-like object 103.

In the example embodiments described above, the system 100 is described with respect to using multiple images to generate the object geolocation/attributes 109 for pole-like objects 103. However, in other example embodiments, the system 100 can determine the objection geolocation/attributes 109 using a single image of the pole-like object 103. More specifically, the system 100 can generate inference data for the detection of pole-like objects 103 and their semantic keypoints as described in the embodiments above, but then use monocular depth estimation to determine depth information for the detected pole-like objects 103 and semantic keypoints form the single image. The 3D coordinate data for the detected pole-like objects 103 and semantic keypoints can then be determined from the monocular depth estimation in combination with the two-dimensional (2D) coordinate of the image based on the camera's poses (position and orientation) and intrinsic parameters.

In one embodiment, the object geolocation/attributes 109 of the pole-like objects 103 can be used for function, service, application, etc. For example, the mapping platform 107 can use the object geolocation/attributes 109 to generate digital map data (e.g., as stored in a geographic database 125) indicating locations/attributes of the detected pole-like objects 103. The geographic database 125 can then be used by client devices (e.g., vehicles 115 and/or UEs 117) for mapping and/or navigation functions (e.g., localization). In other examples, the mapping platform 107 can provide the object geolocation/attributes 109 as output to other components of the system 100 over a communication network 127. The other components include but are not limited to a services platform 129 comprising one or more services 131a-131n (also collectively referred to as services 131), and/or content providers 133 that provide location-based services and/or any other type of service relying on such data.

In one embodiment, as shown in FIG. 1, the mapping platform 107 one or more components for pole or other object extraction from optical imagery according to the various embodiments described herein. It is contemplated that the functions of the components of the mapping platform 107 may be combined or performed by other components of equivalent functionality. As shown, in one embodiment, the mapping platform 107 includes the machine learning system 105 and photogrammetry system 111. The above presented components of the mapping platform 107 can be implemented in hardware, firmware, software, or a combination thereof. Though depicted as a separate entity in FIG. 1, it is contemplated that the mapping platform 107 may be implemented as a module of any of the components of the system 100 (e.g., a component of the services platform 129, services 131, content providers 133, UEs 117, vehicles 115, and/or the like). In another embodiment, one or more of the mapping platform 107, machine learning system 105, and/or photogrammetry system 111 may be implemented as a cloud-based service, local service, native application, or combination thereof. The functions of the mapping platform 107, machine learning system 105, and photogrammetry system 111 are discussed with respect to the figures below.

Figure 3:
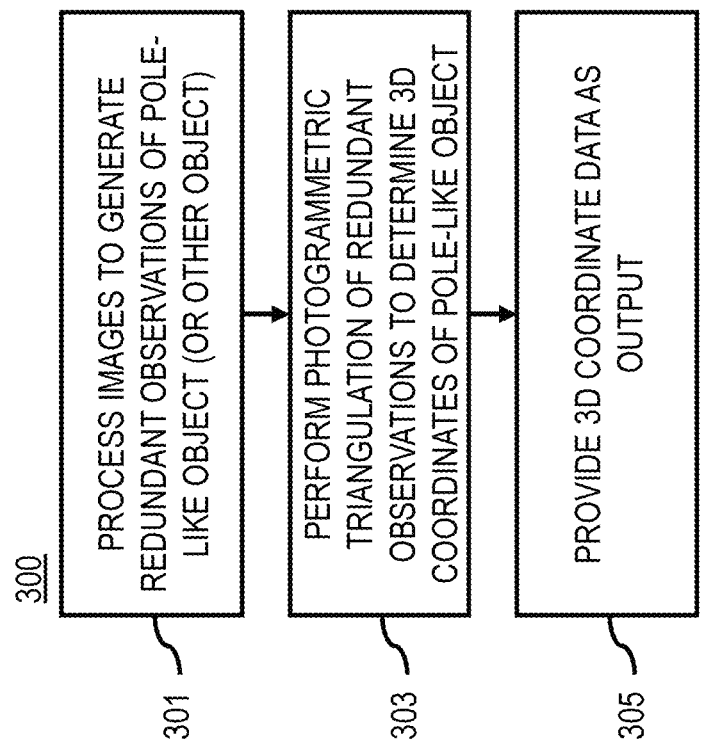
FIG. 3 is a flowchart of a process for pole or object extraction from optical imagery, according to example embodiments.
Figure 11:
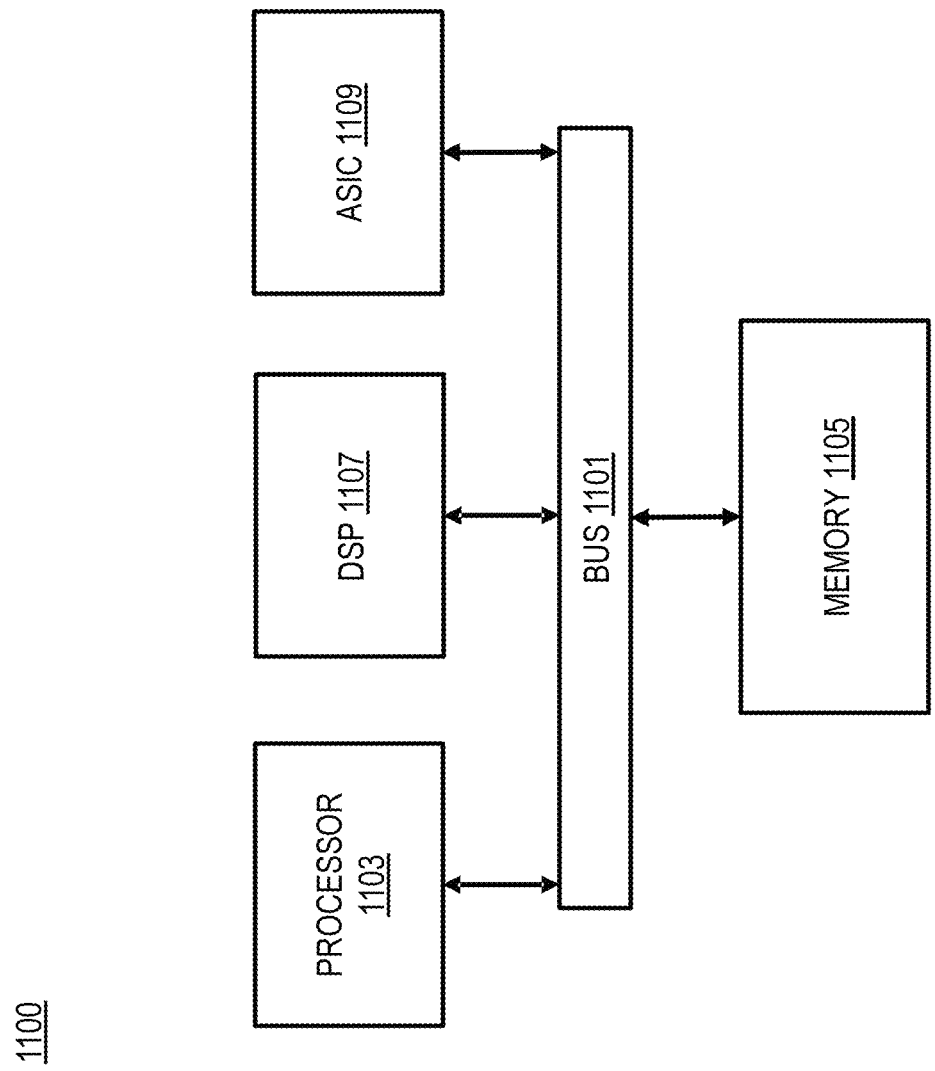
FIG. 11 is a diagram of a chip set that can be used to implement an embodiment of the processes described herein.

FIG. 3 is a flowchart of a process 300 for pole or object extraction from optical imagery 101, according to one embodiment. In various embodiments, the mapping platform 107, machine learning system 105, and photogrammetry system 111 may perform one or more portions of the process 300 and may be implemented in, for instance, a chip set including a processor and a memory as shown in FIG. 11. As such, the mapping platform 107, machine learning system 105, and photogrammetry system 111 can provide means for accomplishing various parts of the process 300, as well as means for accomplishing embodiments of other processes described herein in conjunction with other components of the system 100. Although the process 300 is illustrated and described as a sequence of steps, it is contemplated that various embodiments of the process 300 may be performed in any order or combination and need not include all of the illustrated steps.

In an example embodiment, the process 300 is summarized as follows. First, pole (or other object) detection from optical imagery 101 (e.g., oblique aerial images) is modeled as: (1) detecting semantic features of the pole-like object 103 (e.g., the straight (and usually near-vertical) subsection of the pole) by detecting semantic keypoints, or (2) detecting a bounding box around a pole-like object 103, or. As described in the embodiments above, the straight/near-vertical subsection of the pole, for instance, can be defined by two semantic keypoints. One semantic keypoint is the bottom point of the pole, and the other semantic keypoint is the top point of the straight/near-vertical subsection. It is noted that the top and bottom points of pole are provided as illustrative examples of semantic keypoints and not as limitations. It is contemplated that any other keypoints (e.g., midpoint of the straight section; points relative to the top, bottom, or midpoints of the straight section of the poles; points on the non-straight portion of the poles, and/or the like) can be used according to the embodiments described herein. Deep learning keypoint detection networks (e.g., machine learning models 121 of the machine learning system 105) are used to detect pole-like objects 103 and/or their semantic keypoints. The resulting inference data 123 represent redundant observations of the pole-like object 103. As used herein, redundant observations refer to multiple observations of the same pole-like object 103 in different images (e.g., from different viewpoints or perspectives).

Then, multi-view photogrammetry is used to match the features from multi-view images (e.g., the detected redundant observations of the inference data 123 generated by the machine learning system 105) and to triangulate them in order to determine the 3D coordinates of pole-like object 103 and/or its semantic keypoints (e.g., the bottom points and the top points of the straight (and usually near-vertical) subsections of the pole-like object 103). Finally, the geometric attributes of the pole-like object 103 such as length and orientation are calculated from the 3D coordinates of the semantic keypoints (e.g., the bottom point and the top point of each pole).

Accordingly, the process 300 begins with step 301 in which the machine learning system 105 processes a plurality of images (e.g., optical imagery 101) using a machine learning model 121 to generate a plurality of redundant observations (e.g., inference data 123) of a pole-like object 103 respectively depicted in the plurality of images. For example, in one embodiment, the machine learning system 105 uses deep learning (e.g., YOLO, faster R-CNN, or equivalent) to detect the bounding box of the pole-like object 103. This approach enables the machine learning system 105 to detect the pole-like object 103 as an aggregate or single object for further processing by the photogrammetry system 111. In one embodiment, multiple images of the pole-like object 103 can be processed to generate redundant observations of same pole-like object 103 for processing via photogrammetry according to the various embodiments step 303 discussed further below.

In addition or alternatively, in other example embodiments, the machine learning system 105 can simultaneously detect the pole-like objects 103 and localize their semantic keypoints from optical imagery 101. Detecting semantic keypoints along with or instead of the pole-like object 103 as single bounding box enables the machine learning system 105 more information about the pole-like object 103 in one pass of the deep learning network than producing just a bounding box as inference data 123. In one embodiment, the semantic keypoints comprise a geometric representation of the pole-like object 103 (i.e., the keypoints can define at least part of the geometric structure of the pole-like object 103). For example, the machine learning system 105 can advantageously use the extracted keypoints to determine geometric attributes of the pole-like object 103 (e.g., length, orientation, and/or the like). This process is described in more detail with respect to FIG. 4 below.

Figure 4:
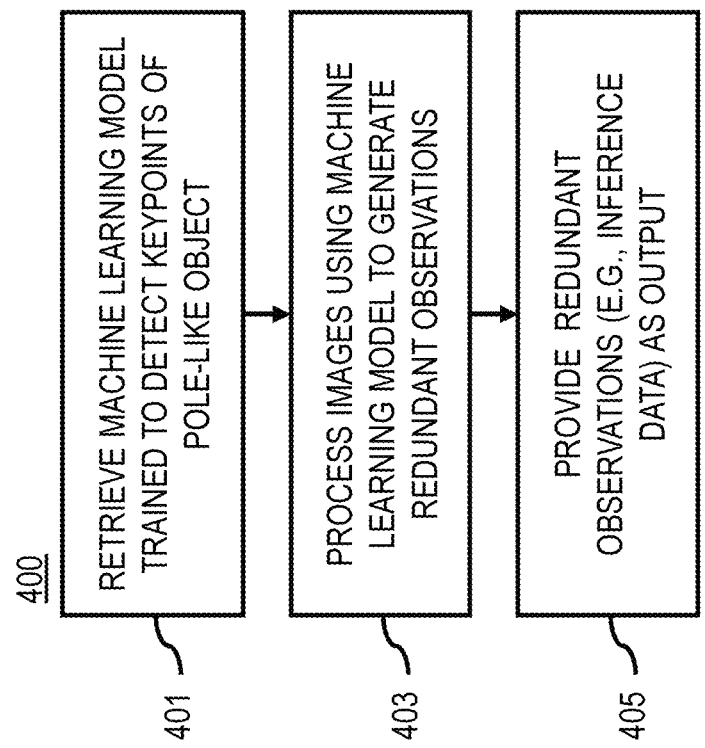
FIG. 4 is a flowchart of a process for extracting semantic keypoints of poles or other objects from optical imagery, according to example embodiments.

FIG. 4 is a flowchart of a process 400 for extracting semantic keypoints of poles or other objects from optical imagery, according to example embodiments. The process 400 can be performed as a standalone process or a part of the step 301 of process 300 when simultaneous extraction of the pole-like object 103 and its semantic keypoints is desired. In step 401, the machine learning system 105 retrieves a machine learning model 121 that is trained to detect one or more semantic keypoints associated with a pole-like object 103 in a plurality of images. For example, the machine learning system 105 can use a keypoint detection deep learning network to directly detect both the semantic keypoints of the pole-like object 103 (e.g., the bottom point and the top point of the poles). The machine learning system 105 can use a Mask R-CNN or equivalent as an example implementation of the keypoint detection deep learning network. Mask R-CNN, for instance, enables image segmentation of input images so that individual pixels or groups of pixels of the input image can be classified into semantic categories corresponding instances of the pole-like object 103 and/or its semantic keypoints. The instance segmentation produces an image mask for each instance of the pole-like object 103 in a processed image as opposed to a bounding box (e.g., produced using YOLO or faster R-CNN in the various embodiments described above). In one embodiment, the Mask R-CNN keypoint detection deep learning network can be trained to simultaneously detect the poles and localize their semantic keypoints without any segmentation.

Figure 5B:
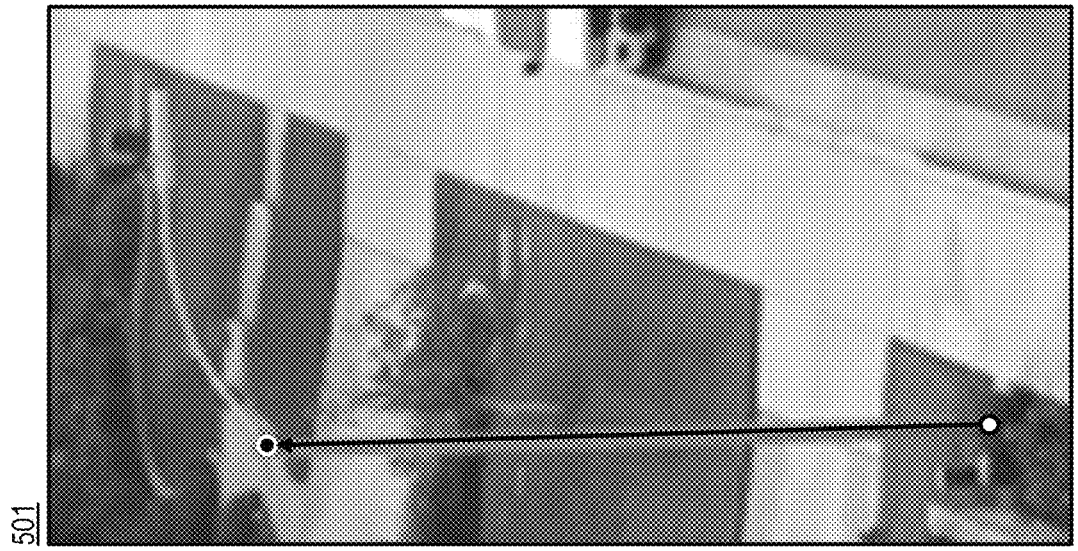
Figure 5A:
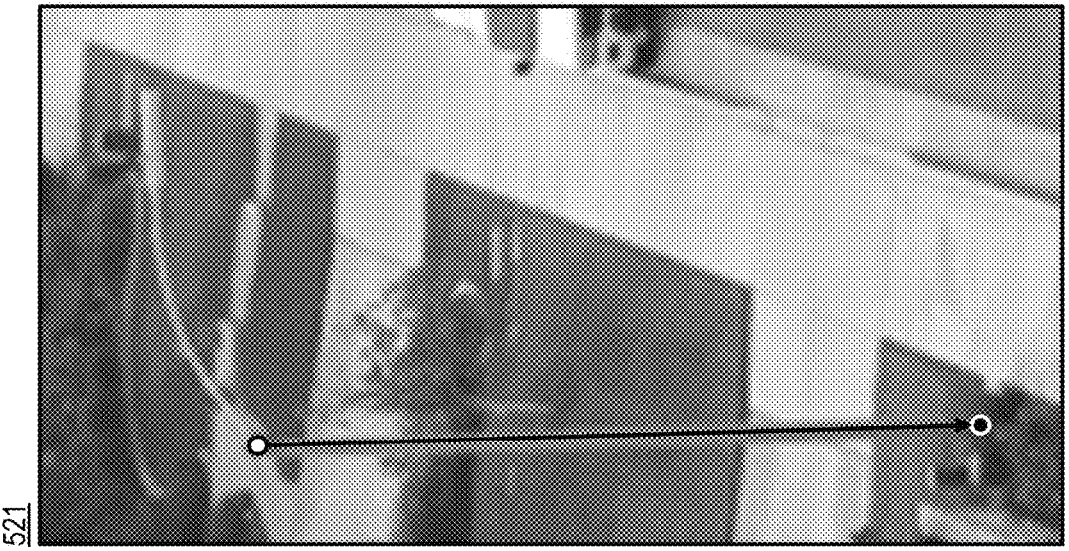

To create labeled data (e.g., training data) for the pole keypoint detection deep learning network, a large set of image chips of the same size, that contain poles, and that cover a diverse set of cities and neighborhood types are manually labeled. To allow the keypoint detection deep learning network to learn the different contexts for semantic keypoints (e.g., the bottom point and the top point of the poles), the ground truth semantic keypoints can be manually labeled in a consistent or otherwise designated order for every pole. The contexts can include, for instance, different environmental conditions, lighting, time of day, weather, etc. As used herein, a consistent order refers to each semantic keypoint being labeled in the same sequence in each of the training image chips. It is contemplated that any consistent order or process can be used to label the keypoints in the training data. Examples of different ways to perform this labeling include but are not limited to: (1) drawing a line from the bottom center point of the pole to the top center point of the straight/near-vertical subsection (e.g., see example 501 of FIG. 5A where the bottom point as indicated by a white dot is connected by a line drawn in the direction of the arrow to the top point as indicated by a black dot); (2) drawing a line from the top center point of the straight/near-vertical subsection to the bottom center point of the pole (e.g., see example 521 of FIG. 5B where the top point as indicated by a white dot is connected by a line drawn in the direction of the arrow to the bottom point as indicated by a black dot); (3) annotating the bottom center of the pole and then separately annotating the top center point of the straight/near-vertical subsection as two semantic keypoints of a single pole object (e.g., see example 541 of FIG. 5C where the bottom point as indicated by a white dot is labeled first and then the top point as indicated by a black dot is labeled second); and (4) annotating the top center point of the straight/near-vertical subsection and then separately annotating the bottom center of the pole as two semantic keypoints of a single pole object (e.g., see example 561 of FIG. 5D where the top point indicated by a white dot is labeled first and then the bottom point as indicated by a black dot is labeled second).

After the selected semantic keypoints (e.g., top and bottom points of the straight section of the pole-like object 103) are labeled for each pole in the images (e.g., reference images to be incorporated in the training dataset), the labeled data are fed into the keypoint detection deep learning network to train the model to detect the poles and their semantic keypoints. As described above, the machine learning system 105 can use a Mask R-CNN or equivalent as an example implementation of the keypoint detection deep learning network. After the network (e.g., machine learning model 121) is trained and validated using the labeled data (e.g., reference images respectively labeled with one or more semantic keypoints under different contexts), the trained model 121 is used to detect the pole-like objects 103 and/or their semantic keypoints from any new images in the full dataset of optical imagery 101.

In one embodiment, remote sensing images such as but not limited to oblique aerial imagery captured by aircraft 112 (or other aerial vehicles or devices) can be included in the optical imagery 101 to process. Remote sensing images typically cover large geographic areas and have large image sizes. To enable reliable pole or other object detection, the machine learning system 105 can run the deep learning inference using images with full resolution, and with the same spatial resolution as the images used for training. Therefore, down-sampling images can be avoided or made optional for inference. In one embodiment, the machine learning system 105 can use a tiling strategy to divide a large aerial image into image tiles that each have the same image width and height (e.g., the same width and height as the images or image chips used for in the reference training images). When tiling, some pole-like objects 103 or other objects of interest may appear at a tile border and not amenable to detection. To enable detection of objects 103 at tile borders, the machine learning system 105 provide for an overlap between adjacent tiles when dividing a large image. The tile overlap width, for instance, should be larger than the longest pole so that the poles in the overlapping areas can be detected.

In step 403 of the process 400, the machine learning system 105 runs deep learning inference on optical imagery 101. In other words, the machine learning system 105 processes a plurality of images (e.g., optical imagery 101 in which the pole-like objects 103 are to be detected) using the machine learning model 121 (e.g., trained and validated according to the embodiments describe above) to generate a plurality of redundant observations (e.g., inference data 123) of the pole-like object 103. In this embodiment, the plurality of redundant observations includes respective detections of the one or more semantic keypoints of the pole-like object 103. After deep learning inference is run on the image tiles (if used), the pole detections are merged into the two-dimensional coordinate system of the original full-size images. In some cases, there could be duplicate detections after merging if a pole is detected in multiple adjacent overlapping image tiles. A standard non-maximum suppression process or equivalent can be applied to all pole detections to remove duplicates.

Figure 6:
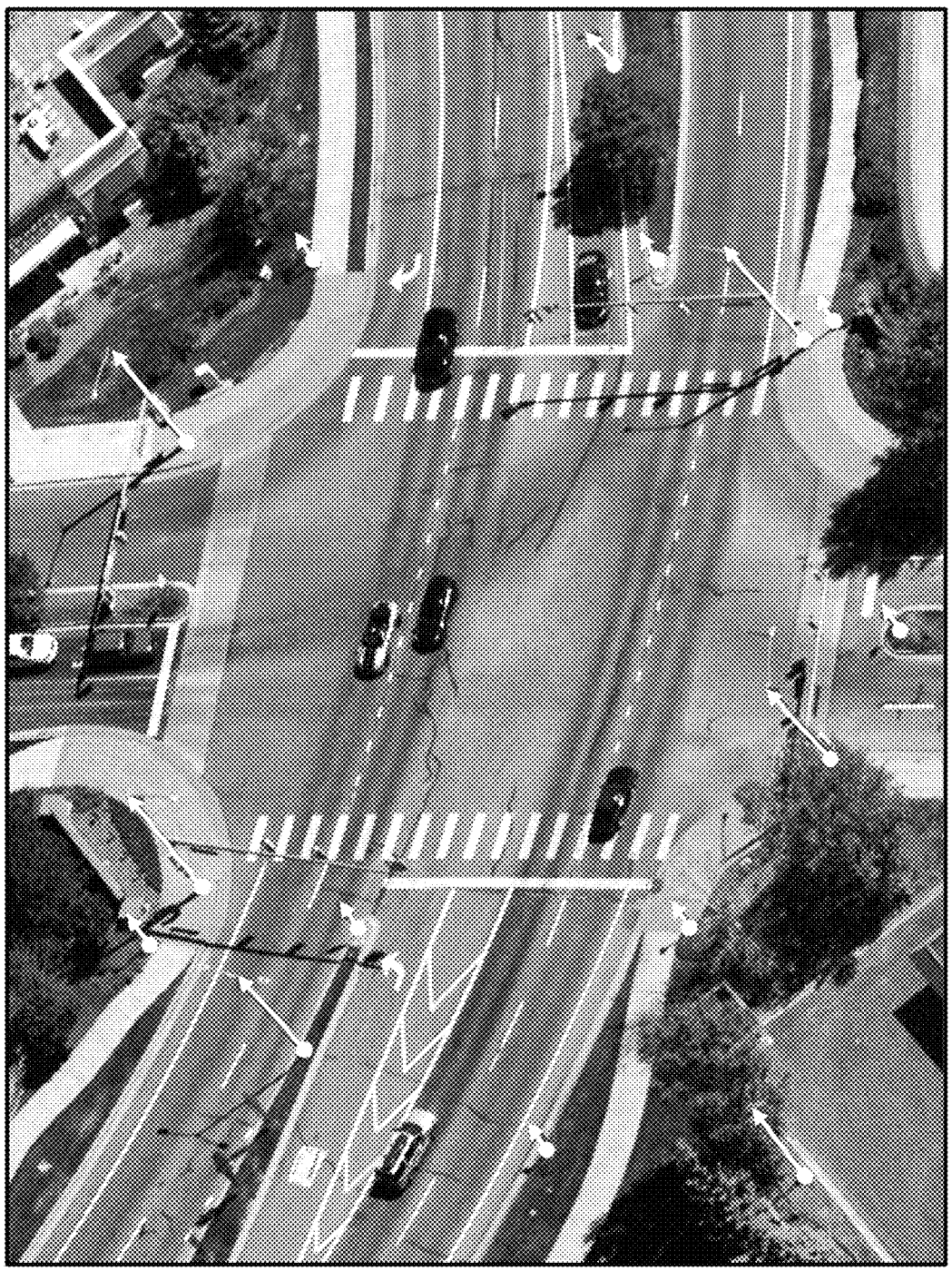
FIG. 6 is a diagram illustrating an image with multiple detected pole-like objects and their respective two semantic keypoints, according to example embodiments.

In step 405 of the process 400, the machine learning system 105 provides resulting inference data 123 (e.g., the plurality of redundant observations) as an output. In one embodiment, this output, for instance, can be used in the photogrammetry process described with respect to step 303 of the process 300 further below. FIG. 6 is a diagram illustrating an image 601 with multiple detected pole-like objects and their respective two semantic keypoints, according to example embodiments. In this example, the detected pole-like objects are shown as arrowed lines. The detected bottom point of each pole is shown as a white dot, and the detected top center point of the pole is shown as the arrow end of the arrowed line.

In one embodiment, after the inference data 123 is determined according to the various embodiments of step 301 of FIG. 3 and/or the process 400 of FIG. 4, the inference data 123 is provided to the photogrammetry system 111 for further processing. For example, in step 303 of process 300, the photogrammetry system 111 performs a photogrammetric triangulation of the plurality of redundant observations (inference data 123) to determine three-dimensional coordinate data of the pole-like object 103. For example, after the poles and/or their two semantic keypoints are detected from multiple images with different viewing angles, logic based on multi-view photogrammetry is used to match the features from multi-view images and to then photogrammetrically triangulate them to determine the 3D coordinates of the bottom points and the top points of all poles.

For metric cameras, the photogrammetry system 111 presumes that the camera poses (exterior orientations) and intrinsic parameters (interior orientations) are known based on prior photogrammetric processing steps (e.g., typically a camera calibration step and a bundle adjustment procedure, as is known by persons skilled in the art).

For images captured from different viewing positions and/or angles, the overlapping portions of adjacent images are related by the epipolar geometry constraint. For a feature point (e.g., a detected instance of a pole-like object 103 or a semantic keypoint of the pole-like object 103) in one of the images, the corresponding point in other images is guaranteed to lie very near to the epipolar line. The photogrammetry system 111 makes use of this epipolar constraint to maximize the efficiency and accuracy of the photogrammetrically based feature matching approach described herein.

In one embodiment, for a selected region on the ground, the photogrammetry system 111 can obtain are n overlapping images from the optical imagery 101 that all see that same common region, wherein n refers to a configurable minimum number of images or a fixed number of images that are that have overlapping fields of view. It is contemplated that the photogrammetry system 111 can use any feature matching and triangulation process known in the art (e.g., processes developed for pinhole cameras). In one embodiment, the photogrammetry system 111 calculates the 3D coordinates of pole like objects 103 from the deep learning detections in all the images as summarized in the steps below.

The previous machine learning steps (e.g., as described in step 301 of FIG. 3 and/or process 400 of FIG. 4) have generated redundant observations (e.g., inference data 123) of many pole-like objects 103 in optical imagery 101 (e.g., oblique aerial images) that have overlapping scene content.

Given these redundant observations of poles, the photogrammetry system 111 first correctly determines which of these observations are associated with the same real-world pole-like objects 103, and the second key step is to use photogrammetric triangulation to determine the three-dimensional coordinates of each observed pole, by intersecting the multiple observation rays associated with each pole's redundant observations.

Figure 7:
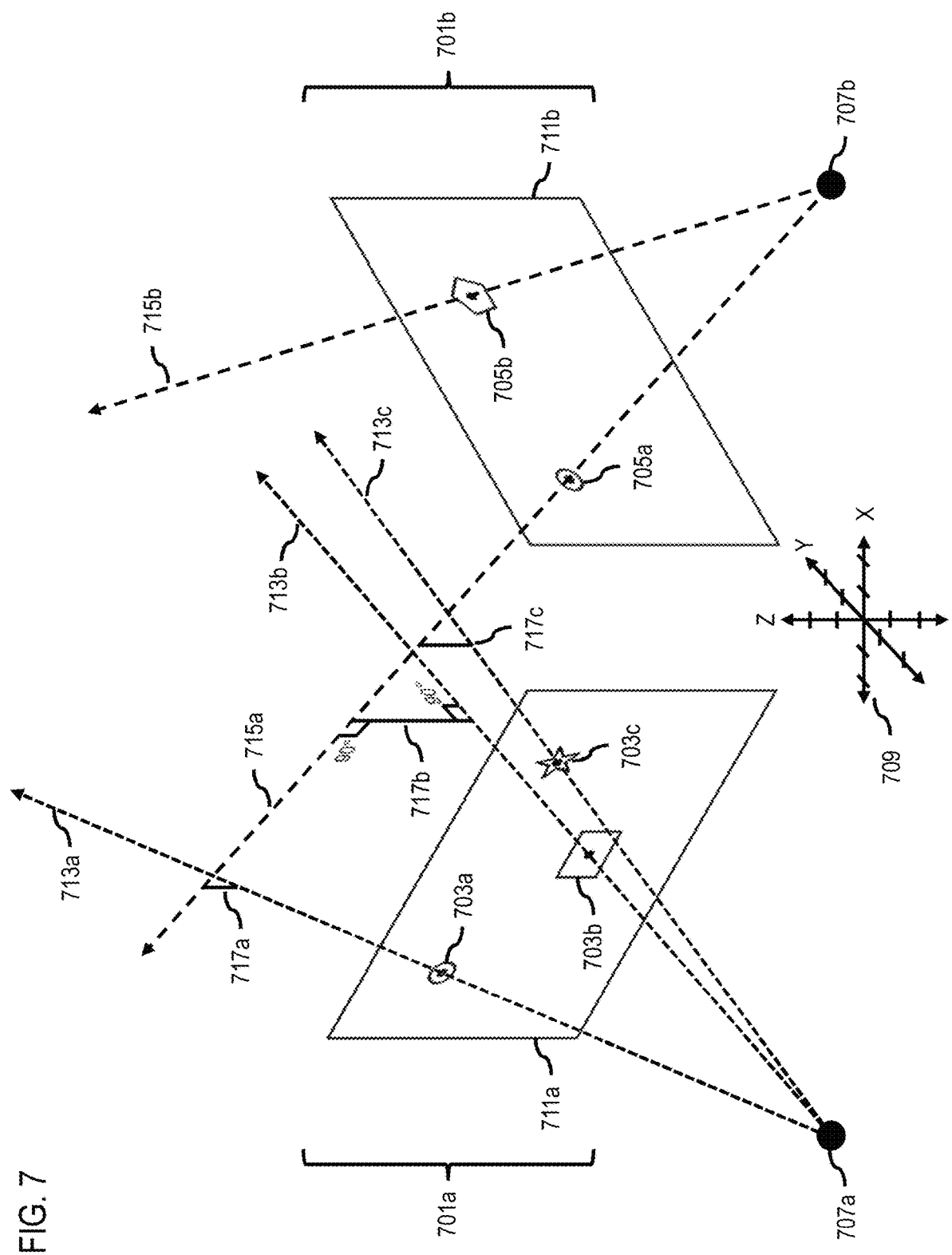
FIG. 7 is a diagram illustrating an example of projecting observation rays to determine feature or object correspondence based on camera geometry, according to example embodiments

FIG. 7 is a diagram illustrating an example of projecting observation rays to determine feature or object correspondence based on camera geometry, according to example embodiments. As shown in the example of FIG. 7, images 701a and 701b have overlapping fields of view and are being processed to determine feature correspondence of redundant observations of pole-like objects 103. Image 701a is labeled with poles and/or their semantic keypoints detected at pixel locations 703a, 703b, and 703c; and image 701b is labeled with poles and/or their semantic keypoints detected at pixel locations 705a and 705b. The photogrammetry system 111 determines camera geometry parameters (e.g., known exterior and interior orientations of the cameras that captured the images) associated with the images 701a and 701b to determines their respective camera locations 707a (e.g., corresponding to image 701a) and 707b (e.g., corresponding to image 701b) with respect to a common or global coordinate system 709. The photogrammetry system 111 also uses the camera geometry parameters to determine image planes 711a (e.g., corresponding to image 701a) and 711b (e.g., corresponding to image 701b) which represent the locations and orientations of the images 701a and 701b with respect to the coordinate system 709.

Then, for each of the labeled or detected pixel locations 703a-703c of the image 701a, the photogrammetry system 111 generates observation respective rays 713a-713c originating from the camera position 707a through each of the labeled or detected pixel locations 703a-703c. Similarly, for each of the labeled or detected pixel locations 705a and 705b of the image 701b, the photogrammetry system 111 generates respective rays 715a and 715b originating from the camera position 707b through each of the labeled or detected pixel locations 705a and 705b. To determine feature correspondence, the mapping platform can iteratively evaluate the closeness between the rays of each image 701a and 701b. For example, ray 715a of image 701b crosses over rays 713a-713c. To determine the closeness values for these rays, the photogrammetry system 111 computes a line segment 717a between rays 713a and 715a, line segment 717b between rays 713b and 715a, and line segment 717c between rays 713c and 715a. As shown in FIG. 7 with respect to line segment 717b, each of the line segments 717a-717c are drawn so that they are orthogonal to each of their respective ray pairs. In one embodiment, this orthogonality of the line segments 717a-717c helps to ensure that the line segments are the shortest or minimum between the rays.

The photogrammetry system 111 then determines the minimum line segment 717a-717c, which is line segment 717a corresponding to the intersection of rays 713a and 715a. The length of the line segment 717a represents the closeness value between rays 713a and 715a. The photogrammetry system 111 can then compare this closeness value (i.e., length of line segment 717a) to a threshold value. In this example, the length of the line segment 717a is less than then threshold value. As a result, the photogrammetry system 111 determines that feature point 703a (e.g., corresponding to ray 713a of image 701a) and feature point 705a (e.g., corresponding to ray 715a of image 701b) depict the same feature, thereby representing a feature correspondence between images 701a and 701b. The photogrammetry system 111 can output labeled or detected pixel location of 703a of image 701a and labeled or detected pixel location 705a of image 701b as a correspondence. Each of the remaining labeled or detected pixel locations in the images 701a and 701b can be similarly evaluated for correspondences. In this example, the only correspondence is between pixel locations 703a and 705a. Pixel locations 703b and 703c of image 701a do not match any rays 715a and 715b of image 701b with the threshold value, and therefore are determined as being visible in image 701a but not in image 701b. Similarly, pixel location 705b of image 701b does not match any rays 713a-713c with the threshold value, and there are determined as being visible in image 701b but not in image 701a.

In one embodiment, the photogrammetry system 111 first generates 3D pole feature candidates to initiate the process illustrated in FIG. 7. This can be accomplished by using the 2D pole observations in each image and looking for similar features in overlapping images that lie within a small number of pixels (e.g., 3 pixels) of the associated epipolar lines in the overlapping images. In other words, the photogrammetry system 111 determines that the plurality of redundant observations correspond to a same object of the one or more pole-like objects based on a distance threshold from respective epipolar lines of the plurality of images. In one embodiment, in the first pass processing, this can be performed using the midpoint between the top and bottom points of poles as convenient proxies for the poles themselves. As a further screening method, the photogrammetry system 111 can optionally apply additional criteria such as but not limited to: (1) the resulting 3D features cannot be within a small 3D distance from already detected features (e.g., 25 cm); and (3) they cannot be more than 100 meters above or below the known ground elevation.

In one embodiment, the photogrammetry system 111 can back project the 3D feature candidates into all oblique images that see it and verify that the back-projected 3D feature falls within a small distance of a 2D feature detection in each image (e.g., 5 pixels). In other words, the photogrammetry system 111 back projects the three-dimensional coordinate data into the plurality of images to perform a validation of the three-dimensional coordinated data. For example, the validation can be based on determining that the back-projected three-dimensional coordinate data falls within a threshold distance of the plurality of redundant observations. With this information, the photogrammetry system 111 can perform additional quality checks to validate the 3D feature candidate including but not limited to: (1) determining that or whether the back-projected three-dimensional coordinate data corresponds to respective two-dimensional features in a minimum number of the plurality of images (e.g., in at least 3 images); (2) determining that a minimum intersection angle of confirmed rays of the photogrammetric triangulation associated with the three-dimensional coordinate data meets an angular threshold (e.g., at least 15 degrees); and (3) determining that a maximum misclosure of the confirmed rays meets a distance threshold (e.g., less than a designated threshold such as 1 meter).

In one embodiment, after the above steps are completed using the midpoints of the poles as proxies, the associated semantic keypoints (e.g., top and bottom pole points) are processed through the same steps. For example, the top and bottom points associated with each pole midpoint are separately intersected from multiple observations in overlapping images to get their 3D coordinates. Then, the resulting 3D points are then back projected into the images that see them and to verify whether they fall within a designated threshold number of pixels from a 2D observation of a top or bottom pole point, respectively. The results optionally are further screened as above, using the intersection ray count for each 3D point, as well as the minimum intersection angle and the maximum misclosure of the intersecting rays, as described above.

Once the full set of 3D poles, including their bottom points and top points are determined, simple math can be applied to calculate length and orientation for each pole. For example, the length of the pole can be determined based on distance between the 3D coordinates of the bottom and top points of the pole. The pole orientation can be determined based on the angle from a ground plane to a line formed from the 3D coordinates of the bottom and to the coordinates of top points. In one embodiment, the determined 3D coordinate data and/or geolocations of the detected pole-like objects 103 and/or their semantic keypoints comprise the object geolocation/attributes data 109.

In step 305 of the process 300, the mapping platform 107 can provide the three-dimensional coordinate data of the pole-like object 103 and/or any of the object geolocation/attributes 109 as an output. As described previously, the output can be used support any number of functions including but not limited to: (1) providing a map of pole-like objects 103 and their attributes (e.g., length, orientation) to communication providers as possible mounting points for wireless communications equipment; (2) generate digital map data of the pole-like objects 103 to facilitate localization (e.g., by vehicles 115, UEs 117, and/or other client devices); and (3) to support applications or functions of the services platform 129, services 131, and/or content providers 133 that rely on or otherwise use the object geolocation/attributes 109 generated according to the various embodiments described herein.

The various embodiments of the process 300 of FIG. 3 are described with respect to pole or other object extraction using multiple images that provide multiple overlapping views of scene content to obtain redundant observations of a pole-like object 103. However, it is also contemplated that the system 100 can also support pole or object extraction using a single image as described in the various embodiments of the process 800 of FIG. 8.

Figure 8:
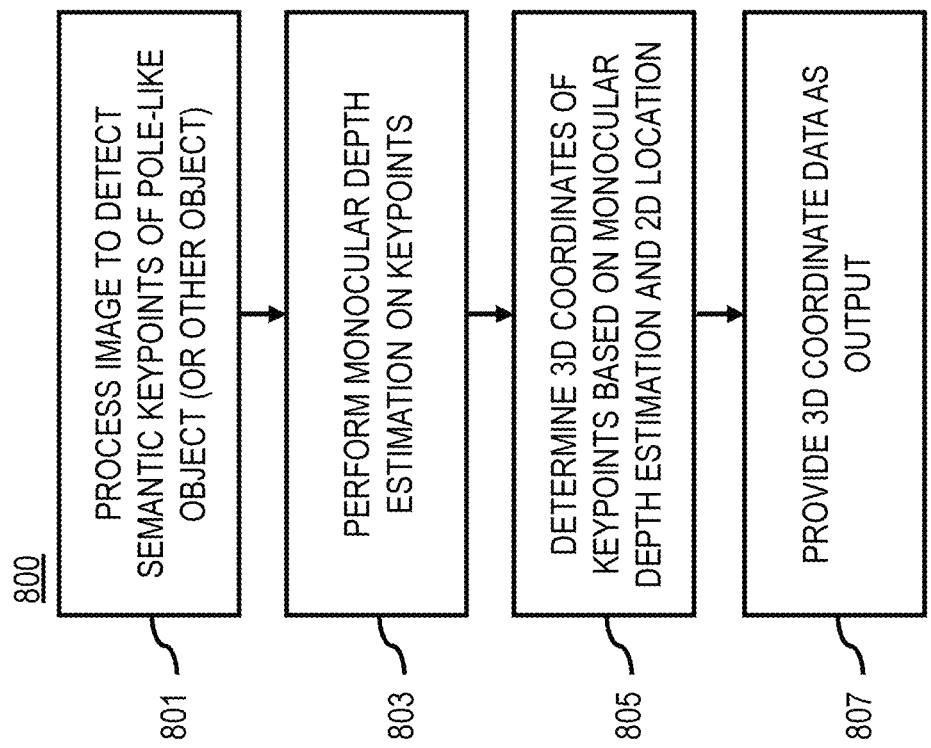
FIG. 8 is a flowchart of a process for pole or object extraction from a single image, according to example embodiments.

FIG. 8 is a flowchart of a process for pole or object extraction from a single image, according to example embodiments. In various embodiments, the mapping platform 107 and machine learning system 105 may perform one or more portions of the process 800 and may be implemented in, for instance, a chip set including a processor and a memory as shown in FIG. 11. As such, the mapping platform 107 and machine learning system 105 can provide means for accomplishing various parts of the process 800, as well as means for accomplishing embodiments of other processes described herein in conjunction with other components of the system 100. Although the process 800 is illustrated and described as a sequence of steps, it is contemplated that various embodiments of the process 800 may be performed in any order or combination and need not include all of the illustrated steps.

In the previously described embodiments of pole or object extraction, multiple images were used to facilitate photogrammetric triangulation which relies on multiple views to triangulate the coordinates of feature or objects of interest. The process 800 eliminates the use of multi-view or stereo photogrammetry since only a single image is used for pole or other object extraction from optical imagery 101. Instead process 800 uses monoscopic photogrammetry procedures since only a single image is involved.

In step 801, the machine learning system 105 processes an image (e.g., single image) using a machine learning model 121 to detect one or more semantic keypoints associated with a pole-like object 103 and to determine two-dimensional coordinate data respectively for the one or more semantic keypoints. In other words, the machine learning system 105 detects pole-like objects 103 and their semantic keypoints (e.g., bottom and top points of poles) simultaneously from a single image using the various embodiment of the deep learning method as described with respect to the process 400 of FIG. 4. The model training, validation, and use described with respect to FIG. 4 applies equivalently to the step 801 except that only a single image needs to be used at a time.

In one embodiment, the semantic keypoints are selected so that they are points on the pole-like object 103 that is some height from the ground.

In step 803, the machine learning system 105 performs a monocular depth estimation to determine depth information for the one or more semantic keypoints based on the image. It is contemplated that the monocular depth estimation can use any process known in the art to estimate the depth of feature or point depicted in a two-dimensional image. Depth, for instance, refers to an estimated distance of the scene object or point from a viewpoint (e.g., camera). With respect to pole-like objects 103, the machine learning system 105 estimates the depth of the bottom and top points of the poles detected from the image using a monocular depth estimation method.

Examples of machine-learning based monocular depth estimation include unsupervised, supervised, or self-supervised learning methods. One example of a supervised machine learning approach for predicting a depth map for a single image is a multi-scale deep network that includes an ensemble of (1) a global coarse-scale network to learn a global view of the scene depicted in an image, and (2) a finer-scale network to learn local details that are associated with depth. For example, the coarse-scale network can process an entire image or larger sections of the image to learn global features related to depth such as but not limited to vanishing points, object locations, geometric alignments of rooms or other environmental features, and/or the like. Then, the finer-scale network which operates with a more limited field of view (e.g., 45×45 pixels as opposed to the entire image on the coarse scale) to learn finer features. The multi-scale network can then be used to predict a depth map of objects (e.g., pole-like objects 103 and/or their semantic features) from a single image.

Another example of a supervised approach to monocular depth estimation is a vision transformer for dense prediction that replaces the use of convolutional networks (e.g., which results in down sampling of input images) with vision transformers that assemble and progressively combine tokens into image-like representations to represent input images at their full resolutions while maintaining a global receptive field. This global receptive field in combination with full resolution representation enables this approach to also capture depth-related features at the global and local scales to provide for improved monocular depth estimation. (See Ranfti et al., "Vision Transformers for Dense Prediction," International Conference on Computer Vision (ICCV), 2021).

One example of an unsupervised approach to monocular depth estimation is unsupervised monocular depth estimation with left-right consistency. In the absence of ground truth data, this approach applies uses trains a network to generate disparity image using an image reconstruction loss in combination with a novel training loss that enforces consistency between the disparities produced relative to both the left and right images. The network trained on these loss functions are then used to predict monocular depth estimation. (See Godard et al., "Unsupervised Monocular Depth Estimation with Left-Right Consistency," eprint arXiv:1609.03677v3, Apr. 12, 2017).

One example of a self-supervised approach to monocular depth estimation involves a combining a minimum reprojection loss designed to handle occlusions, a full-resolution multi-scale sampling method to reduce artifacts, and an auto-masking loss to handle pixels that violate camera motion assumptions. (See Godard et al., "Digging into Self-Supervised Monocular Depth Estimation," eprint arXiv:1806.01260, June 2018).

It is noted that the examples of monocular depth estimation approaches described above are provided by way of illustration and not as limited. As noted, it is contemplated that any monocular depth estimation known in the art including both machine learning and non-machine learning based approaches can be used according to the embodiments described herein.

In other words, the machine learning system 105 and/or mapping platform 107 takes a single image in which one or more pole-like objects 103 and/or their semantic keypoints (e.g., top and bottom points of poles) are detected, and process the image using any known monocular depth estimation approach to determine the depth information for the corresponding detected semantic keypoints.

In step 805, the mapping platform 107 determines three-dimensional coordinate data for the one or more semantic keypoints based on the monocular depth information and the two-dimensional coordinate data. In one embodiment, the mapping platform 107 determines the 3D coordinates of the bottom and top points of poles from their 2D coordinates and depths using, for instance, inverse projection transformation from 2D to 3D or equivalent (e.g., the inverse of the projection described with respect to FIG. 7). For example, an inverse projection reconstructs a projection ray from the pixel in the image corresponding to the detected semantic keypoint or pole-like object 103 and uses the depth estimate for that pixel from the monocular depth estimation to compute the 3D coordinate of the corresponding surface point that is located on the projection ray.

In step 807, the mapping platform 107 can provide the determined 3D coordinate data as an output for use in various applications, functions, services, etc. as described with respect to process 300 of FIG. 3. In one embodiment, the output can be used to calculate geometric attributes (e.g., length, orientation) for poles. In other words, once the full set of 3D poles, including their semantic keypoints (e.g., bottom and top points) are determined, simple math can be applied to calculate length and orientation for each pole or other object of interest as described in the various embodiments above. These calculated attributes can also be provided as an output for use according to the embodiments described in the process 300 of FIG. 3.

Returning to FIG. 1, as shown, the system 100 includes the mapping platform 107 that includes a machine learning system 105 and photogrammetry system 111 for pole or other object extraction from optical imagery 101. In embodiments in which the pole or object extraction is based on a single image and monocular depth estimation, the mapping platform 107 may include just the machine learning system 105 without a photogrammetry system 111. The machine learning system 105 includes or is otherwise associated with one or more machine learning models 121 (e.g., neural networks or other equivalent networks) for performing various embodiments of the machine learning tasks described herein for pole or other object extraction from optical imagery.

In one embodiment, the mapping platform 107, machine learning system 105, and/or photogrammetry system 111 have connectivity over the communication network 127 to the services platform 129 that provides one or more services 131 that can use pole or object geolocation/attributes 109 to perform one or more functions. By way of example, the services 131 may be third party services and include but is not limited to mapping services, navigation services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services 131 uses the output of the mapping platform 107 (e.g., object geolocation/attributes 109) to provide services 131 such as navigation, mapping, other location-based services, etc. to the client devices such as but not limited to vehicles 115, UEs 117, and/or applications 119 executing on the UEs 117.

In one embodiment, the mapping platform 107, machine learning system 105, and/or photogrammetry system 111 may be a platform with multiple interconnected components. The mapping platform 107, machine learning system 105, and/or photogrammetry system 111 may include multiple servers, intelligent networking devices, computing devices, components, and corresponding software for combining location data sources according to the various embodiments described herein. In addition, it is noted that the mapping platform 107, machine learning system 105, and/or photogrammetry system 111 may be a separate entity of the system 100, a part of the one or more services 131, a part of the services platform 129, or included within components of the vehicles 115 and/or UEs 117.

In one embodiment, content providers 133 may provide content or data (e.g., including machine learning models 121, training data, optical imagery 101, etc.) to the mapping platform 107, machine learning system 105, photogrammetry system 111, services platform 129, services 131, vehicles 115, UEs 117, and/or the applications 119 executing on the UEs 117. The content provided may be any type of content, such as machine learning models, extracted feature data, map content, textual content, audio content, video content, image content, etc. In one embodiment, the content providers 133 may provide content that may aid in pole or other object extraction from optical imagery 101 according to the various embodiments described herein. In one embodiment, the content providers 133 may also store content associated with the mapping platform 107, machine learning system 105, photogrammetry system 111, geographic database 125, services platform 129, services 131, and/or any other component of the system 100. In another embodiment, the content providers 133 may manage access to a central repository of data, and offer a consistent, standard interface to data, such as a repository of the geographic database 125.

In one embodiment, the vehicles 115 and/or UEs 117 may execute software applications 119 to object geolocation/attributes 109 and/or inference data 123 according to the embodiments described herein. By way of example, the applications 119 may also be any type of application that is executable on the vehicles 115 and/or UEs 117, such as autonomous driving applications, routing applications, mapping applications, location-based service applications, navigation applications, device control applications, content provisioning services, camera/imaging application, media player applications, social networking applications, calendar applications, and the like. In one embodiment, the applications 119 may act as a client for the mapping platform 107 and perform one or more functions associated with pole or other object extraction from optical imagery 101 alone or in combination with the mapping platform 107.

By way of example, the vehicles 115 and/or UEs 117 is or can include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the vehicles 115 and/or UEs 117 can support any type of interface to the user (such as "wearable" circuitry, etc.). In one embodiment, the vehicles 115 and/or UEs 117 may be associated with or be a component of a vehicle or any other device.

In one embodiment, the aircrafts 112, satellites 113, vehicles 115 and/or UEs 117 are configured with various sensors for generating or collecting optical image data, related geographic data, etc. In one embodiment, the sensed data represent sensor data associated with a geographic location or coordinates at which the sensor data was collected, and the polyline or polygonal representations of detected objects of interest derived therefrom to generate the digital map data of the geographic database 125. By way of example, the sensors may include a global positioning sensor for gathering location data (e.g., GPS), IMUs, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the vehicles 115 and/or UEs 117 may include light sensors, orientation sensors augmented with height sensors and acceleration sensor, tilt sensors to detect the degree of incline or decline (e.g., slope) along a path of travel, moisture sensors, pressure sensors, etc. In a further example embodiment, sensors about the perimeter of the vehicles 115 and/or UEs 117 may detect the relative distance of the device or vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the vehicles 115 and/or UEs 117 may include GPS or other satellite-based receivers to obtain geographic coordinates from positioning satellites for determining current location and time. Further, the location can be determined by visual odometry, triangulation systems such as A-GPS, Cell of Origin, or other location extrapolation technologies.

In one embodiment, the communication network 127 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, 5G New Radio networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 107, machine learning system 105, photogrammetry system 111, services platform 129, services 131, vehicles 115 and/or UEs 117, and/or content providers 133 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
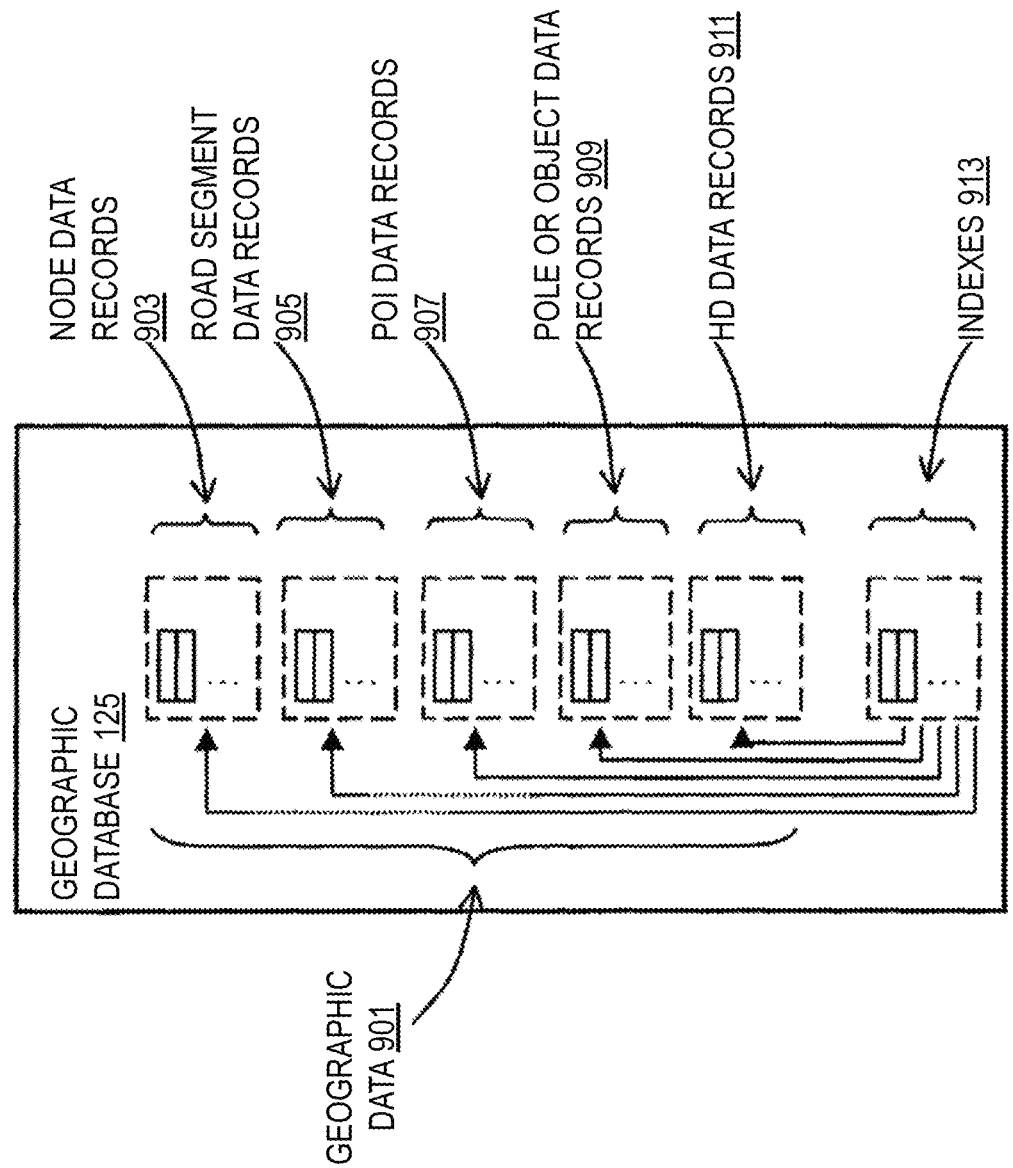
FIG. 9 is a diagram of a geographic database, according to one embodiment.

FIG. 9 is a diagram of a geographic database 125, according to one embodiment. In one embodiment, the geographic database 125 includes geographic data 901 used for (or configured to be compiled to be used for) mapping and/or navigation-related services, such as for providing map embedding analytics according to the embodiments described herein. For example, the map data records stored herein can be used to determine the semantic relationships among the map features, attributes, categories, etc. represented in the geographic data 901. In one embodiment, the geographic database 125 include high definition (HD) mapping data that provide centimeter-level or better accuracy of map features. For example, the geographic database 125 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as signposts, including what the signage denotes. By way of example, the HD mapping data enable highly automated vehicles to precisely localize themselves on the road.

In one embodiment, geographic features (e.g., two-dimensional or three-dimensional features) are represented using polylines and/or polygons (e.g., two-dimensional features) or polygon extrusions (e.g., three-dimensional features). In one embodiment, these polylines/polygons can also represent ground truth or reference features or objects (e.g., signs, road markings, lane lines, landmarks, etc.) used for visual odometry. For example, the polylines or polygons can correspond to the boundaries or edges of the respective geographic features. In the case of a building, a two-dimensional polygon can be used to represent a footprint of the building, and a three-dimensional polygon extrusion can be used to represent the three-dimensional surfaces of the building. Accordingly, the terms polygons and polygon extrusions as used herein can be used interchangeably.

In one embodiment, the following terminology applies to the representation of geographic features in the geographic database 125.

"Node"— A point that terminates a link.

"Line segment"— A straight line connecting two points.

"Link" (or "edge")— A contiguous, non-branching string of one or more line segments terminating in a node at each end.

"Shape point"— A point along a link between two nodes (e.g., used to alter a shape of the link without defining new nodes).

"Oriented link"— A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 125 follows certain conventions. For example, links do not cross themselves and do not cross each other except at a node. Also, there are no duplicated shape points, nodes, or links. Two links that connect each other have a common node. In the geographic database 125, overlapping geographic features are represented by overlapping polygons. When polygons overlap, the boundary of one polygon crosses the boundary of the other polygon. In the geographic database 125, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 125 includes node data records 903, road segment or link data records 905, POI data records 907, pole or object data records 909, HD mapping data records 911, and indexes 913, for example. More, fewer, or different data records can be provided. In one embodiment, additional data records (not shown) can include cartographic ("cartel") data records, routing data, and maneuver data. In one embodiment, the indexes 913 may improve the speed of data retrieval operations in the geographic database 125. In one embodiment, the indexes 913 may be used to quickly locate data without having to search every row in the geographic database 125 every time it is accessed. For example, in one embodiment, the indexes 913 can be a spatial index of the polygon points associated with stored feature polygons. In one or more embodiments, data of a data record may be attributes of another data record.

In exemplary embodiments, the road segment data records 905 are links or segments representing roads, streets, or paths, as can be used in the calculated route or recorded route information for determination of one or more personalized routes. The node data records 903 are end points (for example, representing intersections or an end of a road) corresponding to the respective links or segments of the road segment data records 905. The road link data records 905 and the node data records 903 represent a road network, such as used by vehicles, cars, and/or other entities. Alternatively, the geographic database 125 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 125 can include data about the POIs and their respective locations in the POI data records 907. The geographic database 125 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 125 can also include pole or object data records 909 for storing object geolocation/attributes 109, inference data 123, machine learning models 121, optical imagery 101, and/or any other related data that is used or generated according to the embodiments described herein. By way of example, the pole or object data records 909 can be associated with one or more of the node records 903, road segment records 905, and/or POI data records 907 to associate the pole or object data records 909 with specific places, POIs, geographic areas, and/or other map features. In this way, the pole or object data records 909 can also be associated with the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include ground truth object models that provide the precise object geometry with polylines or polygonal boundaries, as well as rich attributes of the models. These rich attributes include, but are not limited to, object type, object location, lane traversal information, lane types, lane marking types, lane level speed limit information, and/or the like. In one embodiment, the HD mapping data records 911 are divided into spatial partitions of varying sizes to provide HD mapping data to end user devices with near real-time speed without overloading the available resources of the devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time data (e.g., including probe trajectories) also at centimeter-level accuracy. Other sensor data can include vehicle telemetry or operational data such as windshield wiper activation state, braking state, steering angle, accelerator position, and/or the like.

In one embodiment, the geographic database 125 can be maintained by the content provider 133 in association with the services platform 129 (e.g., a map developer). The map developer can collect geographic data to generate and enhance the geographic database 125. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 125 can be a master geographic database stored in a format that facilitates updating, maintenance, and development. For example, the master geographic database or data in the master geographic database can be in an Oracle spatial format or other format (e.g., capable of accommodating multiple/different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by vehicles 115 and/or UEs 117. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing pole (or other object) extraction from optical imagery 101 may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
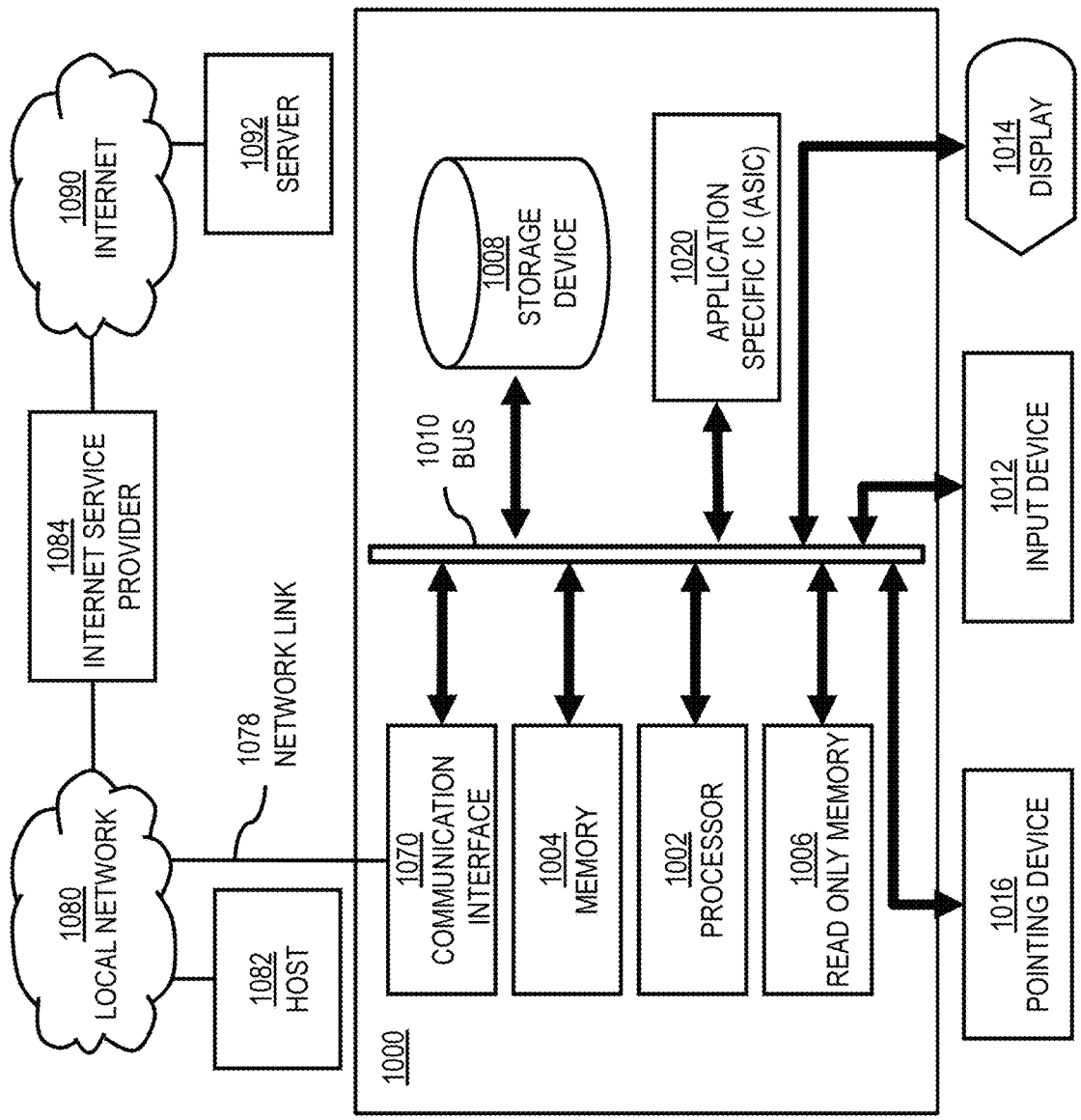
FIG. 10 is a diagram of hardware that can be used to implement an embodiment of the processes described herein.

FIG. 10 illustrates a computer system 1000 upon which an embodiment of the invention may be implemented. Computer system 1000 is programmed (e.g., via computer program code or instructions) to provide pole (or other object) extraction from optical imagery 101 as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to providing pole (or other object) extraction from optical imagery 101. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RANI) or other dynamic storage device, stores information including processor instructions for providing pole (or other object) extraction from optical imagery 101. Dynamic memory allows information stored therein to be changed by the computer system 1000. RANI allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for providing pole (or other object) extraction from optical imagery 101, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 127 for providing pole (or other object) extraction from optical imagery 101.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092.

FIG. 11 illustrates a chip set 1100 upon which an embodiment of the invention may be implemented. Chip set 1100 is programmed to provide pole (or other object) extraction from optical imagery 101 as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to provide pole (or other object) extraction from optical imagery 101. The memory 1105 also stores the data associated with or generated by the execution of the inventive steps.

Figure 12:
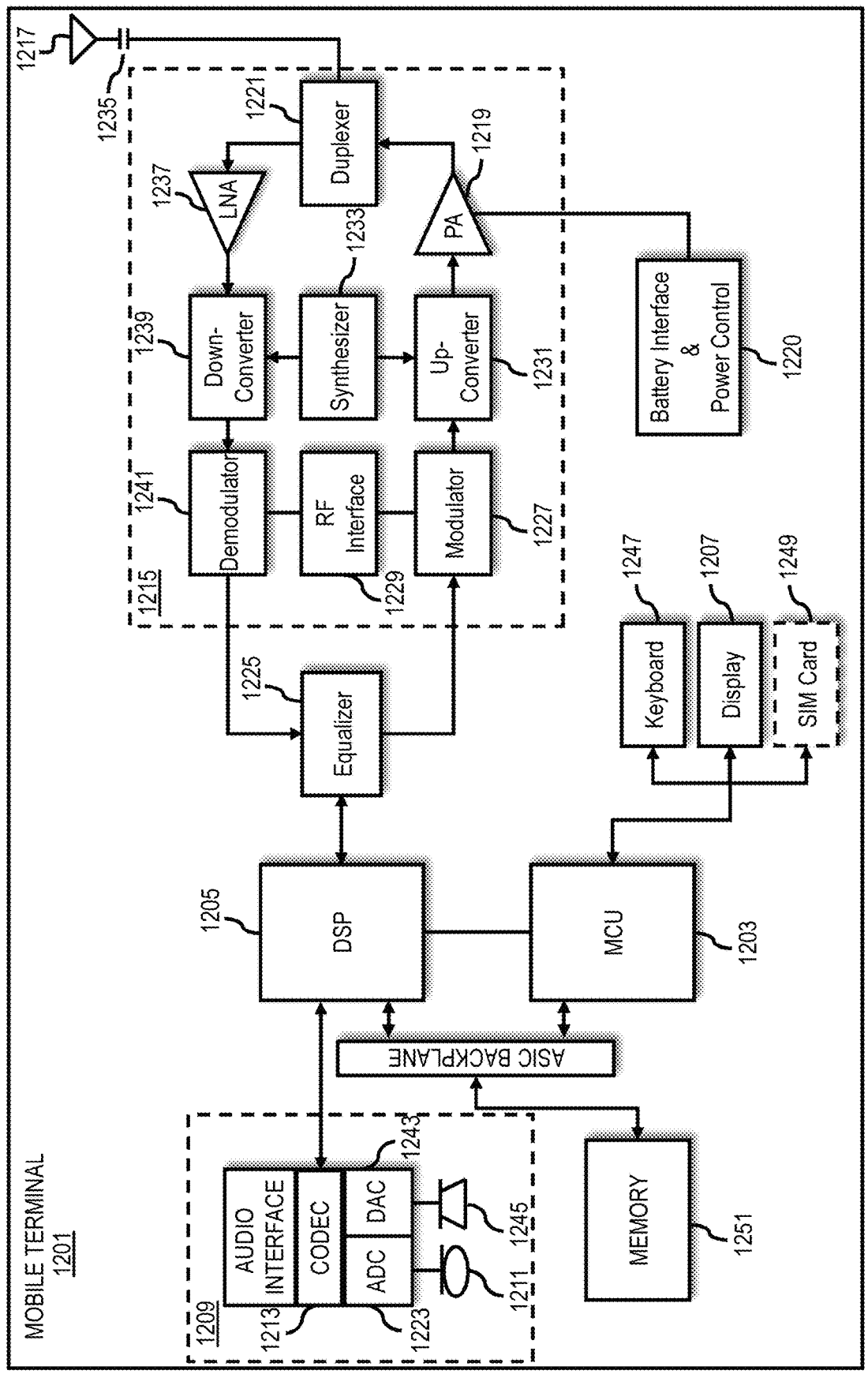
FIG. 12 is a diagram of a terminal that can be used to implement an embodiment of the processes described herein.

FIG. 12 is a diagram of exemplary components of a mobile terminal (e.g., UE 117, vehicle 115, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, 5G New Radio networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to provide pole (or other object) extraction from optical imagery 101. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
    processing a plurality of images using a machine learning model to generate a plurality of redundant observations of a pole-like object respectively depicted in the plurality of images;
    performing a photogrammetric triangulation of the plurality of redundant observations to determine three-dimensional coordinate data of the pole-like object, wherein the machine learning model generates the plurality of redundant observations based on detecting one or more semantic keypoints comprising a geometric representation of the pole-like object, and wherein the three-dimensional coordinate data include respective three-dimensional coordinates of the one or more semantic keypoints;
    determining a location, a geometric attribute, or a combination thereof of the pole-like object based on the three-dimensional coordinate data; wherein the geometric attribute includes a length, an orientation, or a combination thereof; and
    providing the three-dimensional coordinate data and the geometric attribute of the pole-like object as an output.

2. The method of claim 1, wherein the one or more semantic keypoints include a bottom point, a top point, a midpoint, or a combination thereof of a straight section of the pole-like object.

3. The method of claim 1, wherein the machine learning model is a Mask Region-Based Convolutional Neural Network (Mask R-CNN) that is trained using a plurality of reference images respectively labeled with a plurality of ground truth semantic keypoints of a plurality of pole-like objects.

4. The method of claim 1, wherein the plurality of pole-like objects in the plurality of reference images is respectively labeled with the plurality of ground truth semantic keypoints in a designated order.

5. The method of claim 1, further comprising:
    back projecting the three-dimensional coordinate data into the plurality of images to perform a validation of the three-dimensional coordinated data,
    wherein the validation is based on determining that the back-projected three-dimensional coordinate data falls within a threshold distance of the plurality of redundant observations.

6. The method of claim 5, wherein the validation is further based on at least one of (1) determining that the back-projected three-dimensional coordinate data corresponds to respective two-dimensional features in a minimum number of the plurality of images; (2) determining that a minimum intersection angle of confirmed rays of the photogrammetric triangulation associated with the three-dimensional coordinate data meets an angular threshold; or (3) determining that a maximum misclosure of the confirmed rays meets a distance threshold.

7. The method of claim 1, further comprising:
    determining that the plurality of redundant observations correspond to a same object of the pole-like object based on a distance threshold from respective epipolar lines of the plurality of images.

8. An apparatus comprising:
    at least one processor; and
    at least one memory including computer program code for one or more programs,
    the at least one memory and the computer program code configured to, within the at least one processor, cause the apparatus to perform at least the following:
    retrieve a machine learning model that is trained to detect one or more semantic keypoints associated with a pole-like object in a plurality of images;
    perform a photogrammetric triangulation of the plurality of redundant observations to determine three-dimensional coordinate data of the pole-like object, the one or more semantic keypoints, or a combination thereof;

process the plurality of images using the machine learning model to generate a plurality of redundant observations of the pole-like object, wherein the plurality of redundant observations includes respective detections of the one or more semantic keypoints;

determine a location, a geometric attribute, or a combination thereof of the pole-like object based on the three-dimensional coordinate data; wherein the geometric attribute includes a length, an orientation, or a combination thereof; and provide the plurality of redundant observations as an output.

9. The apparatus of claim 8, wherein the one or more semantic keypoints include a bottom point, a top point, a midpoint, or a combination thereof of a straight section of the pole-like object.

10. The apparatus of claim 8, wherein the machine learning model is trained using a plurality of reference images respectively labeled with the one or more semantic keypoints under one or more different contexts.

11. The apparatus of claim 10, wherein one or more semantic keypoints are labeled in a designated order.

12. A non-transitory computer-readable storage medium carrying one or more sequences of one or more instructions which, when executed by one or more processors, cause an apparatus to perform:

processing a plurality of images using a machine learning model to generate a plurality of redundant observations of an object respectively depicted in the plurality of images;

performing a photogrammetric triangulation of the plurality of redundant observations to determine three-dimensional coordinate data of the object;

wherein the machine learning model generates the plurality of redundant observations based on detecting one or more semantic keypoints comprising a geometric representation of the pole-like object, and wherein the three-dimensional coordinate data include respective three-dimensional coordinates of the one or more semantic keypoints;

determining a location, a geometric attribute, or a combination thereof of the pole-like object based on the three-dimensional coordinate data; wherein the geometric attribute includes a length, an orientation, or a combination thereof; and providing the three-dimensional coordinate data and the geometric attribute of the object as an output.

13. The non-transitory computer-readable storage medium of claim 12, wherein the machine learning model is a Mask Region-Based Convolutional Neural Network (Mask R-CNN) that is trained using a plurality of reference images respectively labeled with a plurality of ground truth semantic keypoints of a plurality of objects.

14. The non-transitory computer-readable storage medium of claim 12, wherein the apparatus is caused to further perform:

back projecting the three-dimensional coordinate data into the plurality of images to perform a validation of the three-dimensional coordinated data, wherein the validation is based on determining the back-projected three-dimensional coordinate data falls within a threshold distance of the one or more redundant observations.

* * * * *